(12) United States Patent
Denome

(10) Patent No.: US 12,722,579 B2
(45) Date of Patent: Sep. 1, 2026

(54) APPARATUS AND METHOD FOR SECURING EQUIPMENT TO LOW PROFILE TRANSPORTABLE HOLDING TANK

(71) Applicant: Crescent Tank Mfg., Bloomfield, NY (US)

(72) Inventor: Robert P. Denome, Bloomfield, NY (US)

(73) Assignee: Crescent Tank Mfg., Bloomfield, NY (US)

(*) Notice: Subject to any disclaimer, the term of this patent is extended or adjusted under 35 U.S.C. 154(b) by 410 days.

(21) Appl. No.: 18/403,398

(22) Filed: Jan. 3, 2024

(65) Prior Publication Data

US 2024/0140330 A1 May 2, 2024

Related U.S. Application Data

(63) Continuation-in-part of application No. 17/885,090, filed on Aug. 10, 2022, now Pat. No. 11,891,239, which is a continuation-in-part of application No. 16/892,265, filed on Jun. 3, 2020, now Pat. No. 11,420,815.

(51) Int. Cl.

| | |
|---|---|
| ***B60R 11/04*** | (2006.01) |
| ***B60R 11/00*** | (2006.01) |
| ***B62D 65/02*** | (2006.01) |
| ***B65D 88/12*** | (2006.01) |
| ***B65D 90/12*** | (2006.01) |

(52) U.S. Cl.

CPC .............. *B60R 11/04* (2013.01); *B62D 65/02* (2013.01); *B65D 88/128* (2013.01); *B65D 90/12* (2013.01); *B60R 2011/004* (2013.01); *B60R 2011/005* (2013.01)

(58) Field of Classification Search

CPC ..... B65D 88/128; B65D 90/16; B60P 3/2215; B60P 3/22; B60K 3/00; B60K 15/00; B62D 61/02; B62K 11/08; B62M 7/00; F16K 15/20

USPC .......... 280/830, 699; 137/255; 180/36, 69.4, 180/303, 310, 225; 220/18; 410/68

See application file for complete search history.

(56) References Cited

U.S. PATENT DOCUMENTS

| | | | | |
|---|---|---|---|---|
| 2,577,836 A * | 12/1951 | Willson | B60P 3/36 | 296/156 |
| 3,131,949 A * | 5/1964 | Black | B60P 3/221 | 220/560.04 |
| 3,187,425 A * | 6/1965 | Black | B60P 3/2255 | 29/469 |

(Continued)

FOREIGN PATENT DOCUMENTS

| | | | |
|---|---|---|---|
| CA | 3090466 C * | 3/2021 | B65D 90/08 |
| CN | 104724407 B * | 5/2017 | B65D 88/128 |

(Continued)

*Primary Examiner* — Lori L Baker

(74) *Attorney, Agent, or Firm* — Jona Patent Firm; Cheng Ning Jong; Tracy P. Jong

(57) ABSTRACT

A system and method for securing equipment to a mobile system are disclosed. The mobile system includes a body supported on side rails and a separate pair of rails supported by the body. Equipment is removably secured to the pair of rails by one or more securing members to permit selective attachment and removal of the equipment while providing stable support during transport.

14 Claims, 17 Drawing Sheets

(56) References Cited

U.S. PATENT DOCUMENTS 3,578,348 A * 5/1971 Reinke ................. A01C 23/008
111/925
3,604,719 A * 9/1971 Kerr ...................... B60P 3/2215
264/225
4,358,054 A * 11/1982 Ehrat ........................ B05B 9/06
239/304
4,543,183 A * 9/1985 Petretti ..................... E03F 7/10
210/241
4,728,144 A * 3/1988 Crean ....................... B60P 3/32
296/156
5,593,070 A * 1/1997 Steadman ............ B65D 88/128
222/608
6,065,686 A * 5/2000 Betts-Williams ....... E01H 11/00
222/617
6,154,917 A * 12/2000 Zahuranec ................ A47L 5/32
15/328
6,340,177 B1 * 1/2002 Granderson ............ B60P 3/224
280/833
6,598,242 B1 * 7/2003 Denome ................. B60R 15/04
220/651
6,723,173 B1 * 4/2004 Golladay ............... A47K 11/00
4/321
7,192,060 B2 * 3/2007 Warrick .................... B60P 3/22
4/321
7,621,565 B2 * 11/2009 Ross, Jr. ................ B60K 15/07
280/830
8,950,530 B2 * 2/2015 Niedzwiecki ............ B60K 6/46
280/33.998
9,187,891 B2 * 11/2015 Aberle .................... E03F 11/00
9,403,640 B1 * 8/2016 Crain ..................... B65D 90/20
9,464,451 B1 * 10/2016 Skaw ........................ B28B 1/14
9,499,105 B1 * 11/2016 Long ....................... B60P 3/055
10,343,583 B1 * 7/2019 Moravec ................ B62D 33/02
10,954,661 B2 * 3/2021 Polston ................. B08B 9/0495
10,967,300 B2 * 4/2021 Droke .................... B01D 19/00
11,396,419 B1 * 7/2022 Peterkin .................. C02F 11/13
11,420,815 B2 * 8/2022 Denome ................ B65D 88/12
11,493,173 B2 * 11/2022 Ramoo ..................... F17C 3/00
11,608,015 B2 * 3/2023 Mann ...................... B60R 15/04
2003/0127255 A1 * 7/2003 Hammonds ............ B62D 11/06
280/830
2008/0223468 A1 * 9/2008 Stegall .................... B60R 15/00
137/899
2010/0147860 A1 * 6/2010 McKenzie .......... E21B 43/2607
220/626
2010/0320727 A1 * 12/2010 Haut ...................... B62D 21/20
280/423.1
2012/0137955 A1 * 6/2012 Van Tassel ............ B63B 25/004
62/48.1
2013/0121781 A1 * 5/2013 Spencer .................. B60P 3/222
410/68
2013/0134170 A1 * 5/2013 Blanco ..................... B61D 5/06
228/101
2015/0175365 A1 * 6/2015 Picard .................... B62D 63/04
414/21
2016/0059764 A1 * 3/2016 Hamm ................... B65D 90/34
280/837
2016/0129826 A1 * 5/2016 Yielding ............... B60P 3/2215
29/428
2017/0096092 A1 * 4/2017 Cannon ................. B60P 3/2295
2018/0209133 A1 * 7/2018 Polston ..................... E03F 9/00
2019/0060794 A1 * 2/2019 Droke ................ B01D 21/0006
2020/0223372 A1 * 7/2020 Aplin ........................ B60R 9/06
2020/0284073 A1 * 9/2020 Thomas, II ............. E05C 1/002
2020/0406809 A1 * 12/2020 Peters ................... B60P 3/2215
2023/0242030 A1 * 8/2023 Peterkin ............. B65D 81/3813
137/340

FOREIGN PATENT DOCUMENTS

DE 102004016812 A1 * 10/2005 .............. B60P 3/426
DE 102008063321 B4 * 11/2010 ........... B65D 88/128
EP 3034413 A1 * 6/2016 ............... B64G 1/58
EP 3822120 A1 * 5/2021 .............. B60P 7/132
KR 20240029205 A * 3/2024 ............. B60R 13/04
WO WO-02100741 A1 * 12/2002 ........... B65G 69/182
WO WO-2012016164 A1 * 2/2012 ............... B61D 5/06
WO WO-2021069275 A1 * 4/2021 ............. B65D 90/34

* cited by examiner 2
26
28
54
46
46
36
74
100
12
18
98

74
58
58

56
2
34
32
116
56
28
26

76
108
54
2
16
18
36
36
74
84
60
16
36

30
112
26
28
114
78
16
2
102
92
90
44
12
52
14
74
60
A
42
50
38
40
48

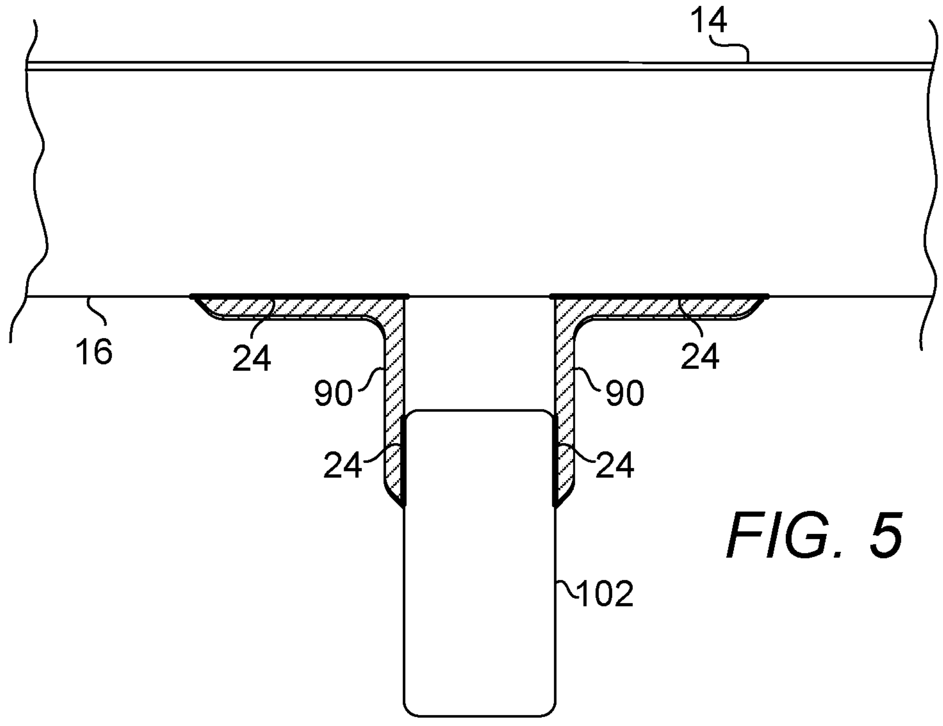
FIG. 5
FIG. 6
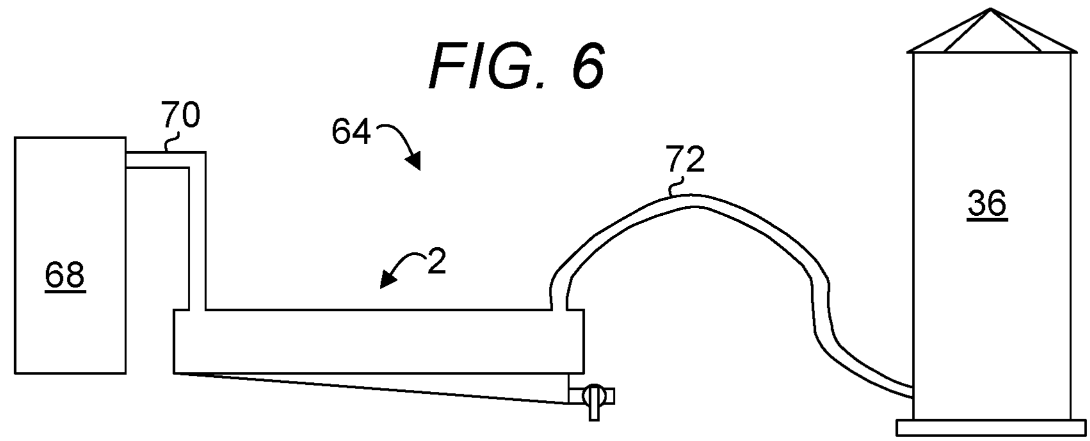

FIG. 7
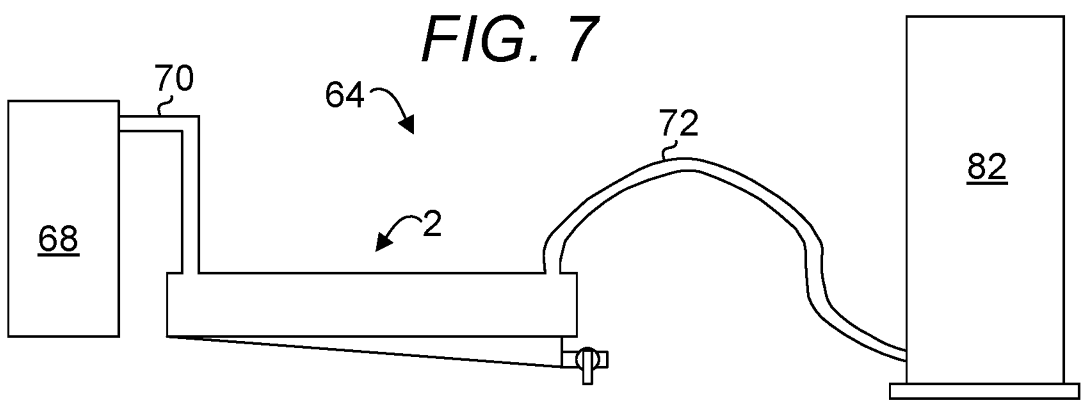
FIG. 8
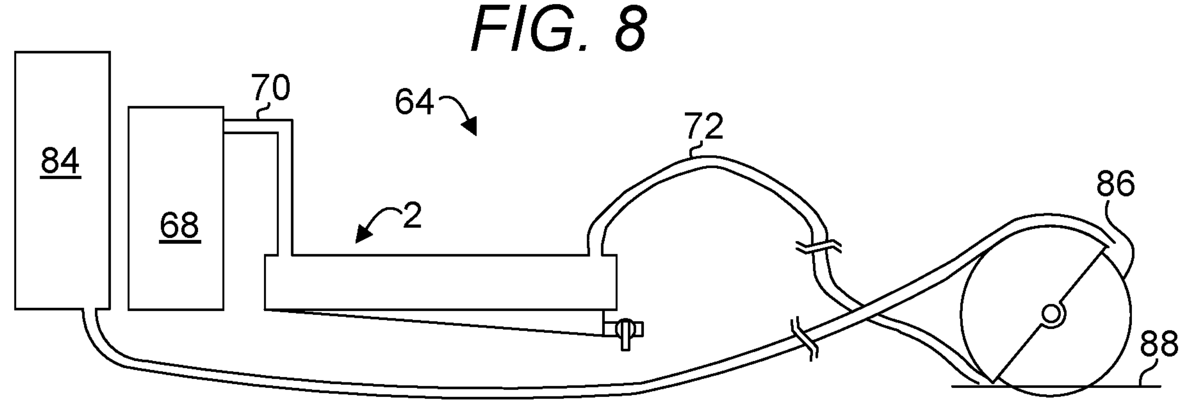
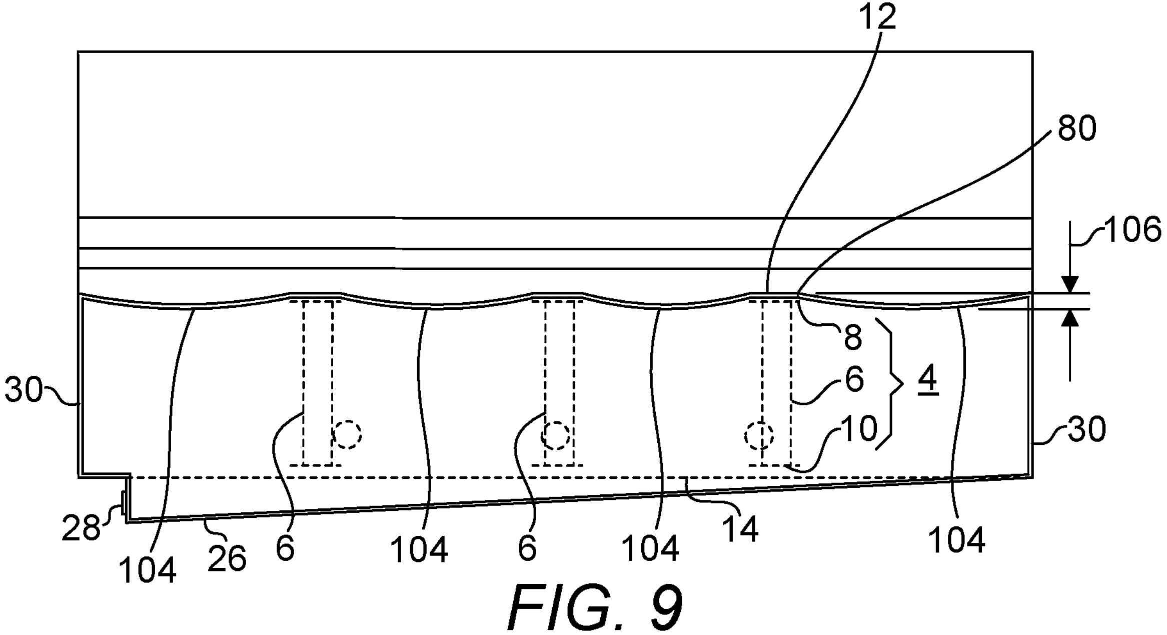
FIG. 9

14
16
190
192
194
188
188
196
44
202
204

APPARATUS AND METHOD FOR SECURING EQUIPMENT TO LOW PROFILE TRANSPORTABLE HOLDING TANK

PRIORITY CLAIM AND RELATED APPLICATIONS

This continuation-in-part application claims the benefit of priority from continuation-in-part application U.S. Ser. No. 17/885,090 filed on Aug. 10, 2022 and non-provisional application U.S. Ser. No. 16/892,265 filed on Jun. 3, 2020. Each of said applications is incorporated by reference in its entirety.

BACKGROUND OF THE INVENTION

1. The Field of the Invention

The present invention relates to an apparatus and method for securing equipment to a truck body. More specifically, the present invention is directed to an apparatus and method for securing equipment to a truck body having a low profile transportable holding tank.

2. Background Art

To transport equipment useful for servicing customers of the waste industry, stock trucks are typically modified to accommodate those equipment such that they can be brought to the customer sites for use therewith. Waste from portable toilets, waste oil from restaurants and service stations, etc., and concrete slurry from cutting machines may be transported in respective holding tanks to their appropriate plants for processing, respectively. Truckbeds/frames of class 5 (Federal Highway Administration—Gross Vehicle Weight Ratings (lbs) 16,001-19,500) to class 8 (Federal Highway Administration—Gross Vehicle Weight Ratings (lbs)>33,001) trucks are typically downwardly-sloped. Therefore, a holding tank having a constant depth will conform to the shape of the bed/frame and will also slope similarly or downwardly. This means the floor of the tank will also slope downwardly and as the natural slope of the tank follows the slope of the truckbed/frame, the tank necessarily drains forwardly naturally, thereby requiring a drain of the tank to be disposed at the front portion of the tank.

U.S. Pat. No. 6,598,242 to Applicant discloses a low profile transportable holding tank for accepting waste from portable toilets. The holding tank is carried on a flatbed vehicle and has a flat deck for cargo, thus effectively increasing the cargo-carrying capacity of the vehicle compared with that available if the vehicle were carrying a conventional holding tank. Internal reinforcement enables the holding tank to withstand a partial vacuum imposed for pumping waste into the tank. Denome discloses a tank having a drainage channel disposed on the rear portion of the tank.

There exists a need for a holding tank system having a holding tank of constant depth which can be completely drained upon being mounted on a truckbed as the floor of the holding tank is inclined downwardly from the floor into a drain channel.

SUMMARY OF THE INVENTION

In accordance with the present invention, there is provided a method for securing a piece of equipment to a mobile system including a side rail and a body disposed over the side rail, the method including:

(*a*) disposing a pair of rails underneath and supported by the body atop the pair of rails; and (b) securing the equipment to the pair of rails with a securing mechanism.

In one embodiment, the method further includes disposing the pair of rails parallel to a heading of the mobile system. In one embodiment, the method further includes disposing the pair of rails in parallel and spaced apart about 6 to 24 inches. In one embodiment, the method further includes powder coating the pair of rails. In one embodiment, the securing mechanism includes a captive nut. In one embodiment, at least one of the pair of rails includes a slot for accommodating the securing mechanism. In one embodiment, the mobile system is a vehicle. In one embodiment, the mobile system is a truck. In one embodiment, the method further includes disposing a transverse support bar between the pair of rails and the equipment to facilitate the securing step.

In accordance with the present invention, there is further provided an apparatus for securing a piece of equipment to a mobile system including a side rail and a body disposed over the side rail, the apparatus including a pair of rails disposed underneath and supported by the body atop the pair of rails, wherein the pair of rails are disposed in parallel.

In one embodiment, the pair of rails are configured to be disposed parallel to a heading of the mobile system. In one embodiment, the pair of rails are spaced apart about 6 to 24 inches. In one embodiment, the pair of rails are configured to be powder coated. In one embodiment, at least one of the pair of rails includes a slot. In one embodiment, the mobile system is a vehicle. In one embodiment, the mobile system is a truck. In one embodiment, the apparatus further includes a transverse support bar configured to be disposed between the pair of rails and the equipment to facilitate securement of the equipment to the mobile system.

An object of the present invention is to provide a system and method for securing a piece of equipment to a mobile system.

An object of the present invention is to provide a system and method for securing a piece of equipment to a truck with a low profile transportable holding tank.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 is a partial cross-sectional view of a support structure configured for resulting in a holding tank having an upward slope as taken along line A-A of FIG. 4.

FIG. 6 is a schematic of a transportable sewage system connected to a portable toilet.

FIG. 7 is a schematic of a transportable waste oil system connected to a waste oil tank.

FIG. 8 is a schematic of a transportable concrete slurry system connected to a concrete cutter.

FIG. 9 is a partially transparent rear view of a holding tank having a deck sheet that is not properly secured where the deck sheet has been damaged due to repeated applications of partial vacuum.

PARTS LIST

Figure 1:
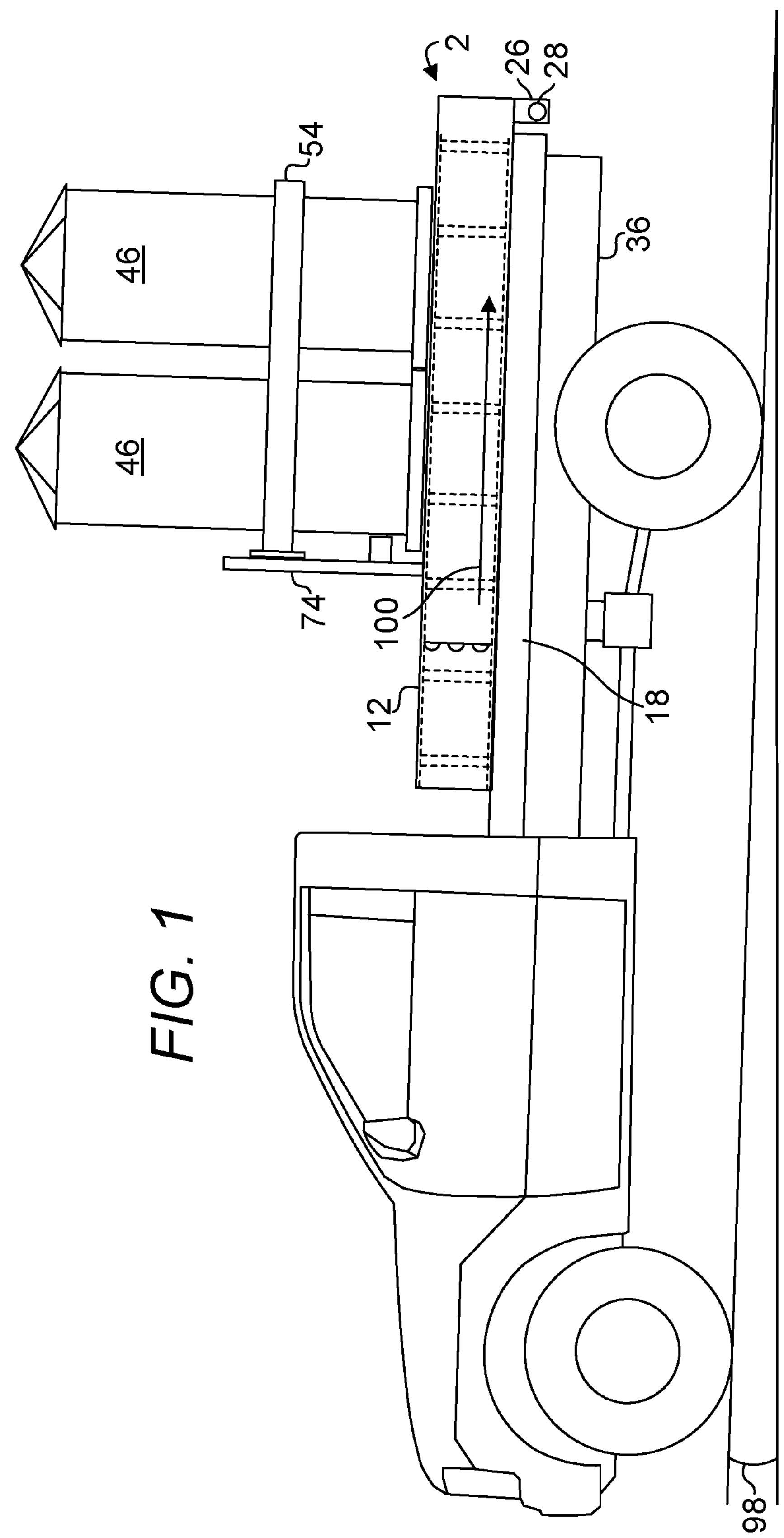
FIG. 1 is a side view of a transportable sewage system aboard a vehicle parked on an incline.

2—low profile holding tank
4—support assembly
6—support pillar
8—support strip
10—reinforcing strip
12—deck sheet
14—tank floor sheet or body of truck supported directly or indirectly on frame/side rails
16—transverse support bar
18—flat truckbed
20—depth of holding tank
22—hole
24—weld
26—drainage channel
28—discharge port
30—wall
32—inlet port
34—evacuation port
36—vehicle
38—downward slope with respect to horizontal plane
40—horizontal plane
42—upward slope with respect to horizontal plane
44—ground
46—portable toilets
48—height of horizontal plane
50—rise
52—run
54—strap
56—handles
58—anchors
60—"fish-eye" sight glasses
62—gap
64—low profile transportable waste system
66—span between support pillars disposed along a widthwise direction of the tank
68—pumping system
70—connection
72—vacuum hose
74—transverse headboard
76—lift gate
78—span between support pillars disposed along a lengthwise direction of the tank
80—crack
82—waste oil tank
84—water tank
86—concrete cutter
88—concrete
90—bracket
92—offset
94—nozzle
96—heading of nozzle with respect to side wall
98—incline
100—direction
102—joist
104—stretched portion
106—droop

108—deck
110—distance between nozzles
112—first plane
114—second plane
116—indent
118—trailer deck
120—strap
122—support member
124—tab
126—suction hose
128—hooks
130—suction tip
132—valve
134—hose holder
136—prong
138—cross bar
140—support leg
142—stabilizer bar
144—rail, e.g., support rail
146—tool box
148—mounting plate
150—strap
152—upper outer layer
154—lower outer layer
156—peripheral wall
158—space
160—upper connection point
162—lower connection point
164—support structure
166—location where plug welding is applied
168—captive nut
170—threaded hole
172—channel
174—friction element
176—spring
178—aperture
180—bolt
182—screw thread
184—retaining element
186—slot
188—frame/side rail
190—support bracket
192—mud flap
194—wheels
196—axle
198—weight of attachment to frame/side rail
200—mechanism for securing equipment to frame/side rail
202—truck
204—fastener
206—spread between two rails
208—plane Particular Advantages of the Invention The present apparatus and method for securing a piece of equipment, e.g., storage system, do not require that a side rail of a vehicle to be modified, removing the potential for the side rail integrity to be compromised. Further, as a common interface is provided for mounting various equipment, no specialized mounting interfaces are required for mounting different equipment at various locations. Yet further, as the apparatus can easily be configured to span a large area or distance, a pair of rails can be used to secure multiple equipment. Yet further, change outs and removals can be performed without damaging mounting interfaces that secure a piece of equipment to a vehicle to which the equipment is secured.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

For a rear-draining holding tank to be completely drained, it is crucial to slope the holding tank upwardly, i.e., with the front end of the holding tank higher than the rear end of the holding tank, to ensure that the contents of the holding tank can eventually collect in a transverse drainage channel disposed on a rear edge of the holding tank and exit the drainage channel via a discharge port disposed at a low point in the drainage channel.

Figure 2:
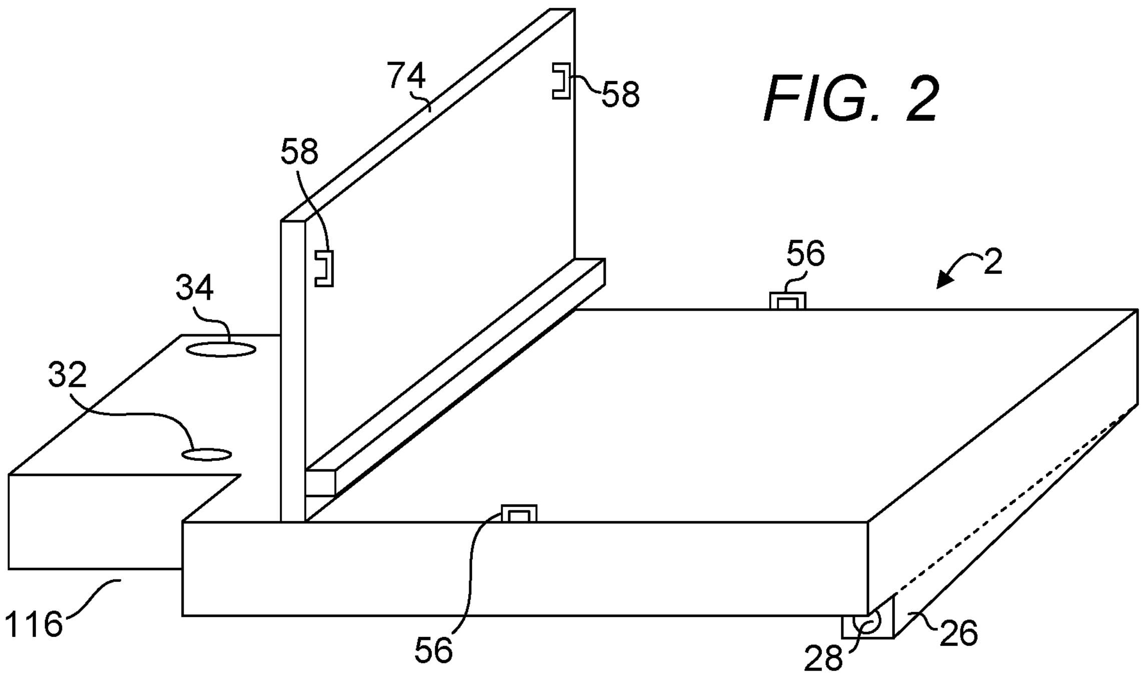
FIG. 2 is a top rear perspective view of a low profile holding tank for a transportable waste system.
Figure 3:
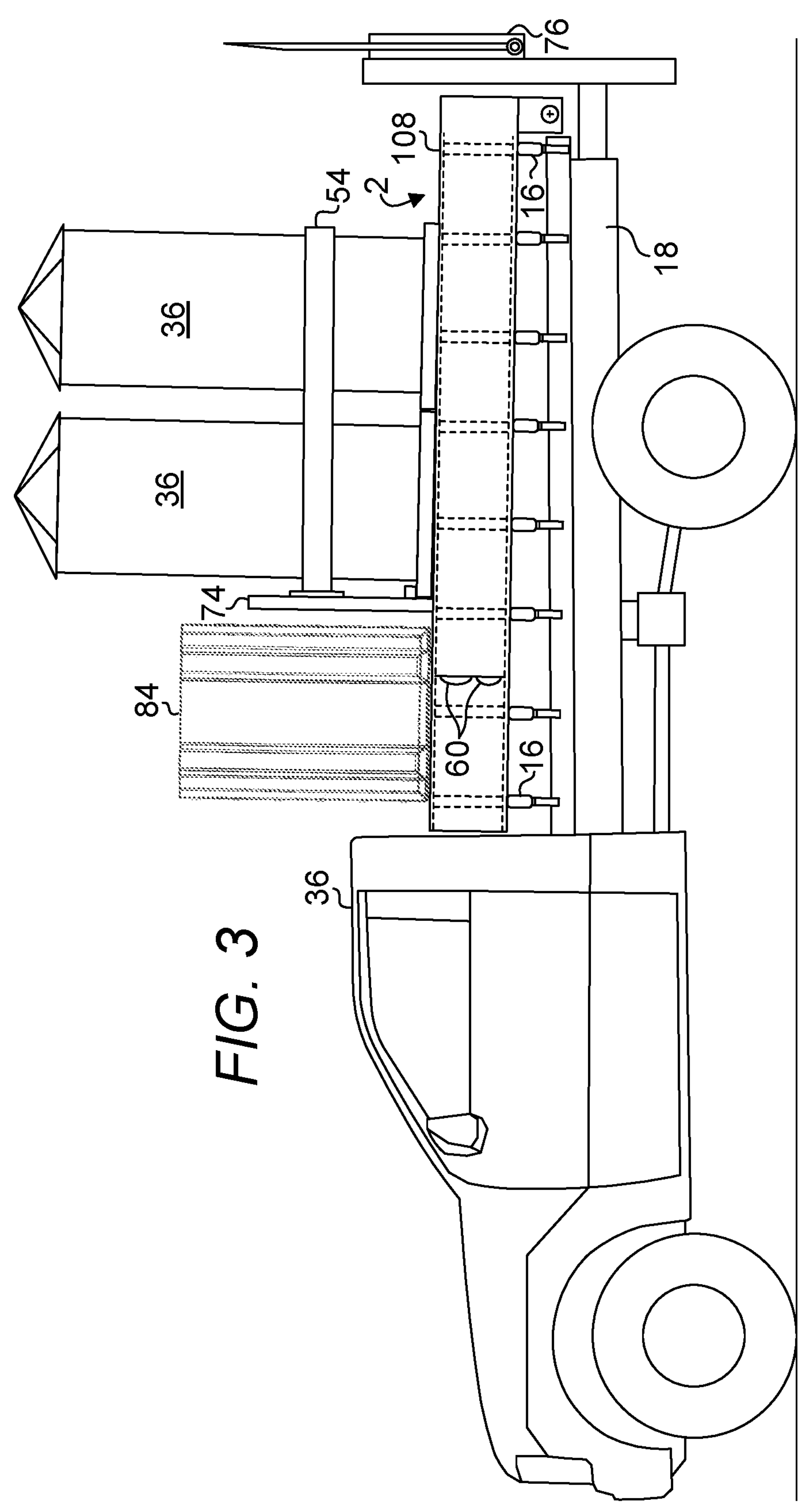
FIG. 3 is a side view of a transportable sewage system aboard a vehicle.

FIG. 1 is a side view of a transportable sewage system aboard a vehicle 36 parked on an incline, e.g., at an angle of greater than 0 degree, depicting a vehicle that is disposed at a slope that allows the holding tank to be completely drained as wastes contained therein flows downwardly in the direction 100. Although the holding tank 2 is capable of draining completely when disposed at an incline as shown in FIG. 1, waste stations or waste-receiving facilities do not have grounds disposed at an incline, rendering the vehicle incapable of completely draining its holding tank. In order to completely drain the holding tank 2 without the aid of ramps, the station or ground on which the vehicle 36 is disposed must be sufficiently elevated at the front end of the vehicle to create sufficient incline 98 for the contents of the holding tank to flow into the drainage channel 26 by gravity. The drainage channel is provided at one edge of the tank floor. The drainage channel slopes down towards an effluent discharge port 28 below the level of the tank floor. The discharge port is typically equipped with a gate valve. The complete draining of the holding tank makes cleaning or rinsing of the interior of the holding tank more effective as this process would not involve first cleaning out the residual wastes retained in the holding tank 2 before its subsequent uses. Complete draining of the holding tank 2 reduces the exposure of the interior surfaces of the holding tank 2 to possible harmful residual materials in tank over prolonged periods of time. Further, unnecessary hauling of residual wastes increases the burden of transportation costs and reduces useful capacity of the holding tank 2. FIG. 2 is a top rear perspective view of a low profile holding tank for a transportable waste system. The holding tank 2 has at least one inlet port 32 for admitting waste from a portable toilet 46 and an evacuation port 34. The truck to which the holding tank 2 is coupled includes a truckbed disposed at a downward slope, i.e., the front end of the truckbed is disposed lower than the rear end of the truckbed. A holding tank disposed on a truckbed necessarily follows the slope of the truckbed and would be required to be disposed with a similar slope, making the drain to be necessarily disposed on the front end of the holding tank. However, the present low profile transportable holding tank, as shown in FIG. 3, is elevated in the front end, not only to overcome the downward slope of the truckbed to which it is disposed but also to create an upward slope for the holding tank to drain towards the rear end of the holding tank. The upward slope of the holding tank removes the need for artificially disposing the truckbed in a manner to cause a net upward slope as the holding tank has already been mounted with an upward slope relative to the truckbed to which the holding tank is mounted.

Figure 4:
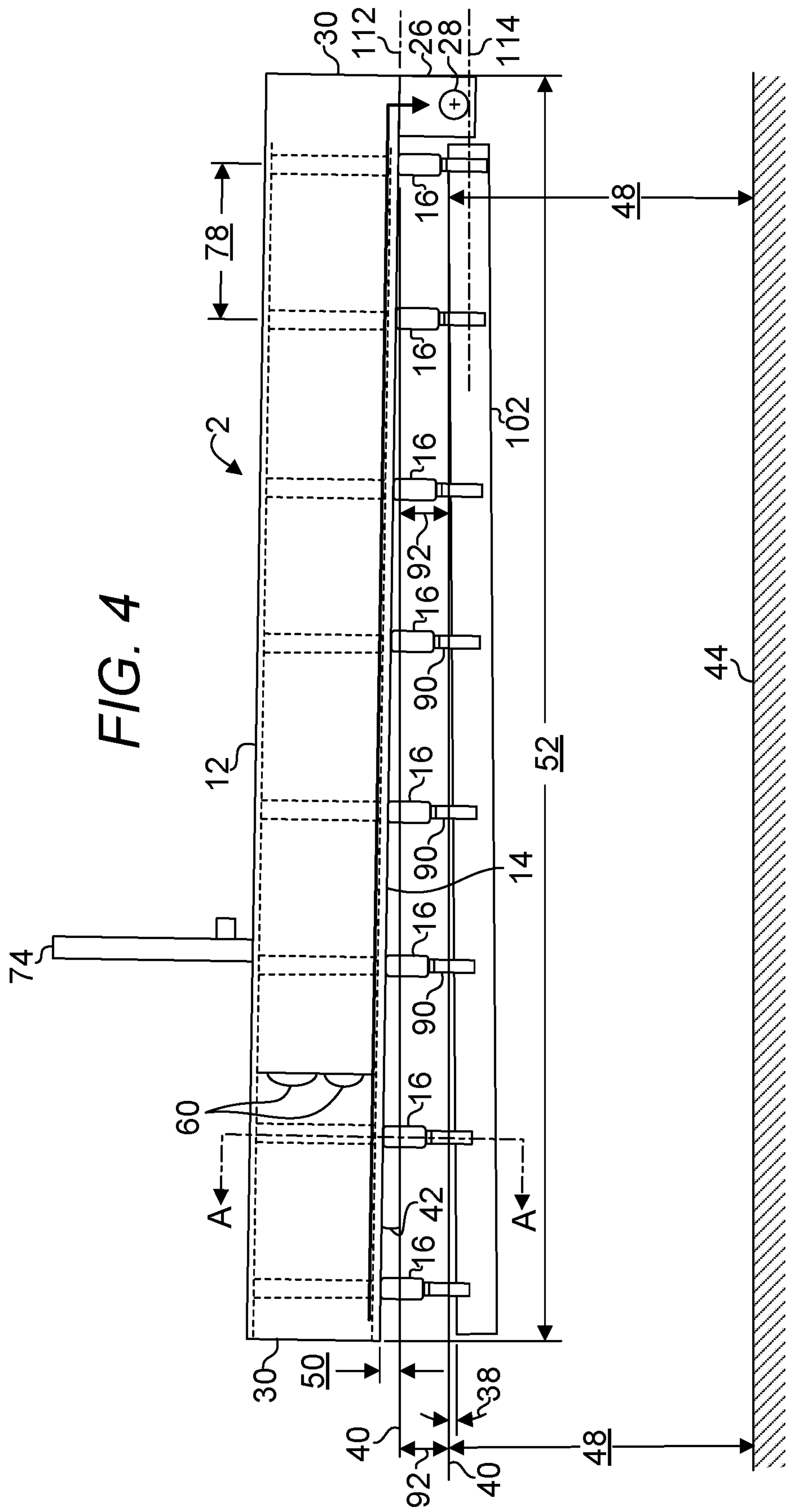
FIG. 4 is a diagram depicting a partially transparent side view of a holding tank disposed at an upward slope.

FIG. 3 is a side view of a transportable sewage system aboard a vehicle 36. A holding tank system is shown disposed on the truckbed 18. FIG. 4 is a diagram depicting a partially transparent side view of a holding tank disposed at an upward slope. The horizontal plane 40 relative to the joists is disposed at a height 48 from the ground 44 level. It shall be noted that the holding tank system includes a holding tank 2 including a floor disposed in a first plane 112, the holding tank configured to be supported on at least a joist 102 (preferably two that are spaced transversely) disposed in a second plane 114, wherein the second plane is disposed at an incline with respect to the first plane. In one embodiment, the incline is configured such that the first plane 112 is disposed at an angle of from about 1 degree to about 5 degrees with respect to a horizontal plane 40 of a vehicle to which the joist is disposed. In the embodiment shown, the holding tank is a low profile transportable holding tank. In one embodiment, the floor further includes a front end and a rear end and the joist includes a front end and a rear end, wherein the floor and the joist 102 converge from their respective front end to their respective rear end. Therefore, in order to ensure that a rear-draining tank can be fully drained, a holding tank is disposed such that a first plane in which a floor of the holding tank is disposed, is disposed at an incline with respect to a second plane in which one or more joists 102 are disposed.

Referring back to FIG. 3, a lift gate 76 is provided to facilitate loading and unloading of the vehicle with portable toilets 46 while serving as a final recourse when the lift gate 76 is disposed in its stowed position for preventing the portable toilets 46 from leaving the truck due to a failure in the securement of the portable toilets 46 to the vehicle. The lift gate 76 is essentially a platform capable to be disposed in a tilted orientation to serve as a gate in its stowed position and a level orientation at two levels, i.e., a deck level and ground 44 level for bridging the deck level and the ground level. In yet another embodiment, a crane is provided alongside the lift gate to further aid the loading and unloading of portable toilets. A transverse headboard 74 is mounted atop the deck 108 by a suitable fastening means. The headboard 74 defines a line dividing the deck 108 into a front deck and a rear deck, the rear deck corresponding to the rear end of the holding tank 2 with the drainage channel 26. The headboard 74 is used to secure one or more portable toilets 36 carried atop the rear deck for transportation to or from a use site and it has fastening means such as a strap 54 that passes through anchors 58 disposed on the headboard 74 or handles 56 disposed on the holding tank 2, the strap is passed around the portable toilets 36, e.g., as many as ten, and secured with a buckle. In one embodiment, the headboard is configured to be modular. In other words, the headboard is not welded to the holding tank and can be removed, e.g., by removing fasteners that secure the headboard to the holding tank for repair and service. The headboard can be made of materials other than mild steel, e.g., aluminum and stainless steel as the headboard is not a load bearing member. In addition to its function as a structure to help contain cargo, the headboard is useful for securing a water tank disposed on the front deck as shown in FIG. 3. At least one waste-level indicator is provided on the holding tank 2, preferably two "fish-eye" sight glasses 60, e.g., of 3-inch and 5-inch diameter, both disposed in a vertical alignment to allow viewing of a wide range of waste levels.

FIG. 5 is a partial cross-sectional view of a support structure configured for resulting in a holding tank having an upward slope as taken along line A-A of FIG. 4. The holding tank 2 is supported on and secured to a plurality of transverse support bars 16 welded to the tank floor sheet 14. The transverse support bars 16 are in turn supported on one or more joist 102 by means of a plurality of bracket sets. Each bracket 90 of the bracket sets is connected to a transverse support bar 16 at its upper end and to a joist 102 at its lower end, both by means of welding. Referring back to FIG. 4, the angle between the first plane 112 and the second plane 114 is then an aggregate of the effects of the downward slope 38, disposed at an angle of, e.g., from about 1 degree to about 5 degrees, of the joist 102 with respect to a horizontal plane 40 and the upward slope 42 of the tank floor sheet 14 with respect to a horizontal plane 40. See the rise 50 over the run 52 which constitute this upward slope 42. The upward slope 42 of the holding tank removes the need for artificially disposing the truckbed in a manner to cause an upward slope as the holding tank has already been mounted with an upward slope relative to the truckbed to which the holding tank is mounted. In the embodiment shown in FIGS. 3 and 4, an offset 92 disposed between the horizontal planes 40, one related to the tank floor sheet 14 and the other to a joist 102, facilitates the use of a forklift or other hoisting chains and other lifting equipment should the holding tank 102 need to be removed and installed.

FIG. 6 is a schematic of a transportable sewage system 64 connected to a portable toilet. The evacuation port 34 is connected via a connection 70 to a standard pumping system 68 that includes a vacuum pump, typically driven by an electric-start internal combustion engine, a vehicle transmission mounted to Power Take Off (PTO), a hydraulic-driven power unit, a combustible engine-driven unit although other types of drive may be used. The pumping system 68 is carried atop the front deck along with other equipment such as a 250 or 350-gallon water tank 84, a wash down pump, and a water hose and hose reel. Although the holding tank 2 is removable from the vehicle 36, it generally remains on the truckbed 18 for an extended time, and the connection 70 may therefore be hard-plumbed. The inlet ports 32 have valves (not shown) for admitting air to equalize internal and external pressures when pumping is complete. The pumping system 68 includes primary and secondary vacuum traps which preclude the entry of fluids from the holding tank 2 into the pump, and also isolate the pump from the holding tank 2 once the latter has been filled to some preselected level. One or more internal anti-surge plate can be added to block contents of the holding tank from surging to one or more traps during transport, keeping the contents from prematurely activating one or more traps. Typically, a 2-inch diameter flexible vacuum hose 72 is used to connect the inlet port 32 and the portable toilet 36, using aluminum cam lock quick disconnect fixtures. In one embodiment, the water tank 84 is a rotationally molded or rotomolded polymeric, e.g., plastic 350-gallon tank with a wall thickness of from about ⅜ inch to about ½ inch. The tank is formed in a dark color, e.g., black, to eliminate the penetration of sunlight to inhibit bacterial or algae growth. Further, as the water tank is constructed from a polymer, e.g., plastic, it is sufficiently flexible to accommodate temperature variations of the stored water without cracking, making it more reliable than water tanks constructed from metals. Yet further, as the water tank is constructed from a polymer, e.g., plastic, the water tank is free of corrosion as in the case of aluminum and sometimes stainless steel, both of which are common materials used in vessels built to store and transport water.

FIG. 7 is a schematic of a transportable waste oil system 64 connected to a waste oil tank 82. Here, the holding tank 2 is used for transporting waste oil from restaurants, service stations and transport containers, etc., to be stored and/or processed prior to its use in internal combustion engines, industrial burners, etc. For some time, it has been known that used cooking oil is a valuable raw material, from which after cleaning and conversion processes, new oils, fats or even biofuels can be obtained. There are large quantities of used cooking oils in restaurants and in the food industry. With relatively simple means, it is worthwhile to set up tanks 82 in the appropriate places to collect used cooking oils transferred, e.g., from deep fryers by restaurant staff. To use the used cooking oils, these tanks 82 are emptied into the present waste oil tank 82 by means of a partial vacuum and transported to a facility for processing or use. Multiple waste oil tanks 82, e.g., four to eight may be transported atop the deck of the holding tank with each having a storage volume of from about 100 gallons to about 250 gallons.

FIG. 8 is a schematic of a transportable concrete slurry system 64 connected to a concrete cutter. Here, the holding tank 2 is used for transporting concrete slurry resulting from concrete cutting. Shown herein is a concrete 88 surface being cut using a concrete cutter 86. A supply of water is provided from a water tank 84 to cool the cutter 86, lubricate the cutter 86 and to suppress dust generated in the cutting process. The mixture of water and concrete solids constitute a concrete slurry which can be drawn into the holding tank 2 by means of a partial vacuum. The ability to evacuate concrete solids and dust during the cutting process eliminates the need for a secondary process that collects the concrete slurry left behind after the cutting process, shortening the overall process that involves the cutting step. The present holding tank 2 may also be used to collect the products of other concrete work, e.g., concrete abrading, grinding, coring, grooving, etc. Any equipment associated with these processes may be transported atop the deck of the holding tank.

FIG. 9 is a partially transparent rear view of a holding tank having a deck sheet 12 that is not properly secured (e.g., the deck sheet 12 is simply supported by one or more support assemblies including support pillars 6 and support strips 8 but not attached to either the support pillars 6 and the support strips 8) where the deck sheet 12 has been damaged due to repeated applications of partial vacuum which resulted in stretched portions 104 that droop downwardly or "belly" between support pillars 6 towards the interior of the holding tank 2. Excessive droops 106 in the deck sheet 12 make for an uneven surface to load cargo, e.g., portable toilets, upon the deck sheet 12. Strain is the response of a material to an applied stress. When the deck sheet 12 is loaded with forces pulling towards the interior of the holding tank 2, the pulling forces produce stresses, which then cause the deck sheet 12 to deform. Engineering strain is defined as the amount of deformation in the direction of the applied force divided by the initial length of the material. Therefore, at a particular strain, the amount of deformation (of the deck sheet 12) in the direction of the force experienced in the deck sheet, increases with an increase in the initial length of the material (e.g., the entirety of the width of the deck sheet 12 as shown in FIG. 9 as compared to the distance between two consecutive support pillars 6 or support strips 8, had the deck sheet 12 been fixedly secured to the two consecutive support pillars 6 and/or support strips 8). Excessive deformation of the deck sheet 12 and alternating stresses to the already stretched and weakened deck sheet 12 can lead to cracking, e.g., fatigue cracking that eventually cause the formation of cracks 80, of the deck sheet 12, resulting in the holding tank 2 losing its ability to maintain airtight operations. The reinforcing strips 10 and the support strips 8 are mild steel strips 2.5 inches wide and 3/16 inch thick. The support pillars 6 are made from tubular mild steel having an outside diameter of 1.5 inches and a wall thickness of 3/16 inch. Within each support assembly 4, the support pillars 6 are spaced at 24 inches intervals. Each indent has an indented area of 24 inches×10 inches.

Figure 10:
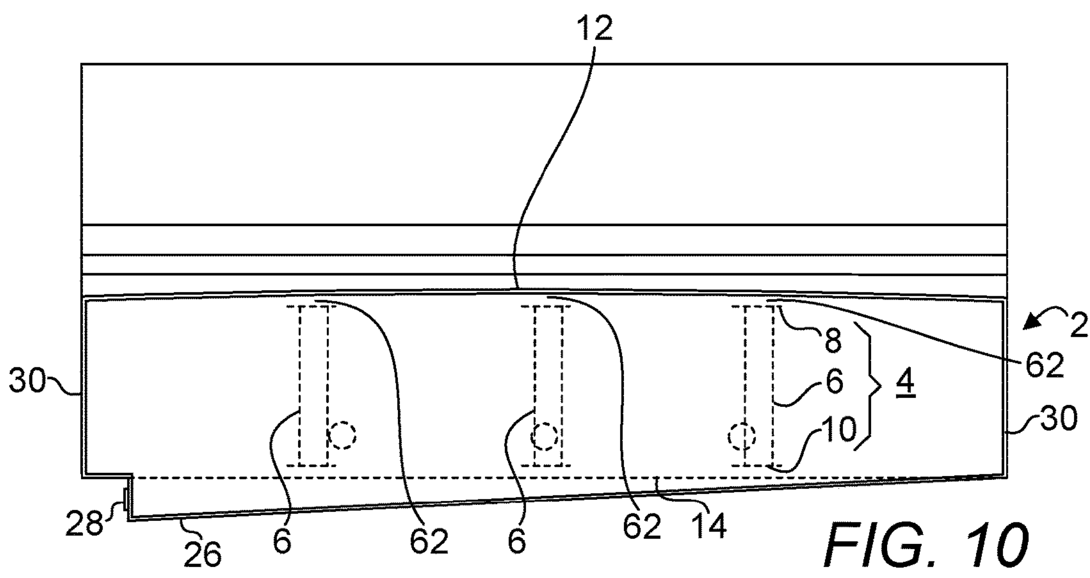
FIG. 10 is a partially transparent rear view of a holding tank having a deck sheet that is not properly secured where the deck sheet has been stretched due to repeated applications of positive pressure to the holding tank.

FIG. 10 is a partially transparent rear view of a holding tank having a deck sheet that is not properly secured where the deck sheet has been stretched due to repeated applications of positive pressure to the holding tank to facilitate unloading of the contents of the holding tank. The effect to the deck sheet 12 subjected to positive pressure to the holding tank, trends in the opposite direction compared to the effect experienced by the deck sheet 12 as shown in FIG. 9. As positive pressure, e.g., 2 psi, is applied to the holding tank 2, the holding tank 2 bulges, leaving a gap 62 between the deck sheet 12 and the support assemblies 4.

Figure 11:
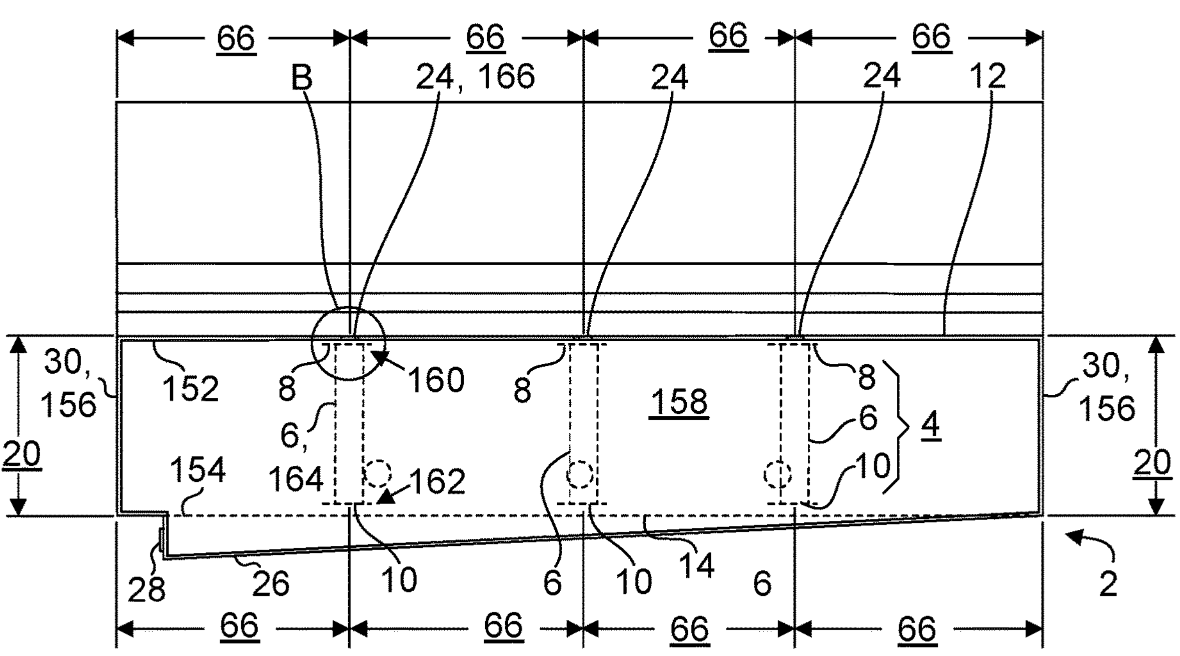
FIG. 11 is a partially transparent rear view of a holding tank having a deck sheet that has been properly secured where the deck sheet has been secured to support pillars.
Figure 12:
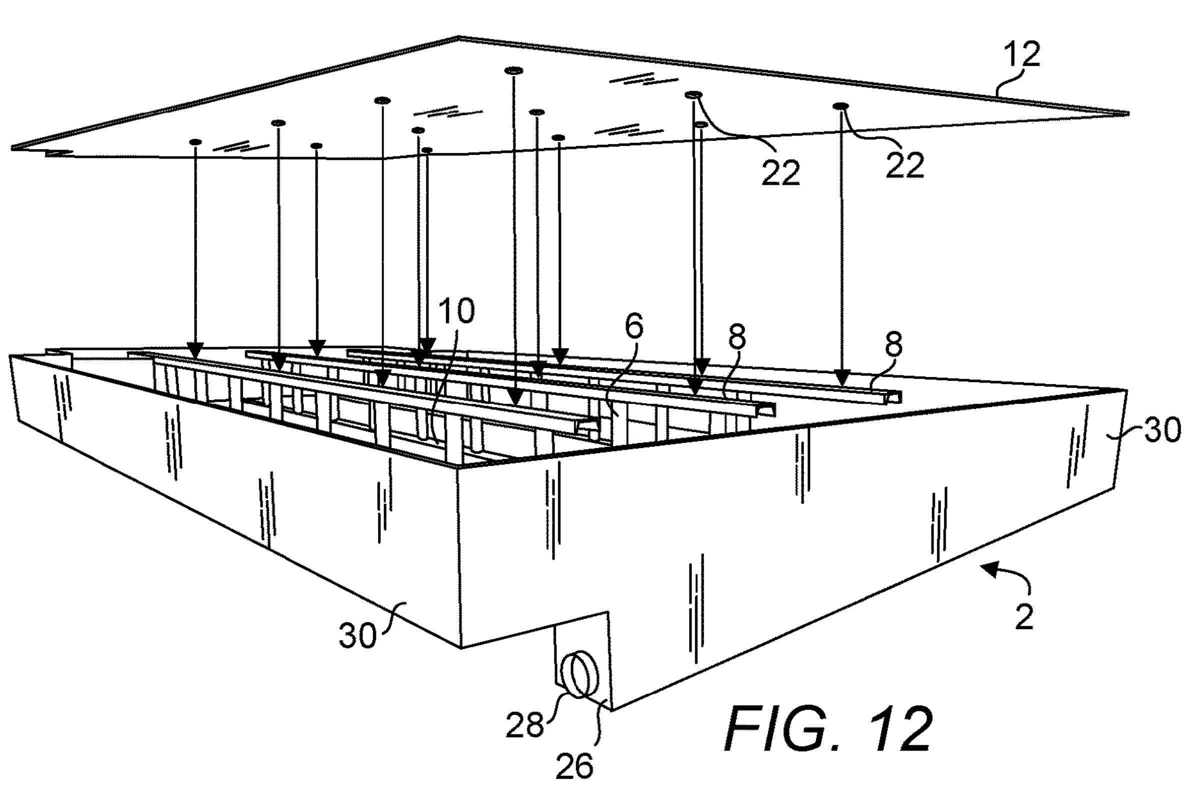
FIG. 12 is a left side rear exploded perspective view of a holding tank with its deck sheet removed to show a manner in which the deck sheet is aligned with support assemblies disposed therewithin.
Figure 13:
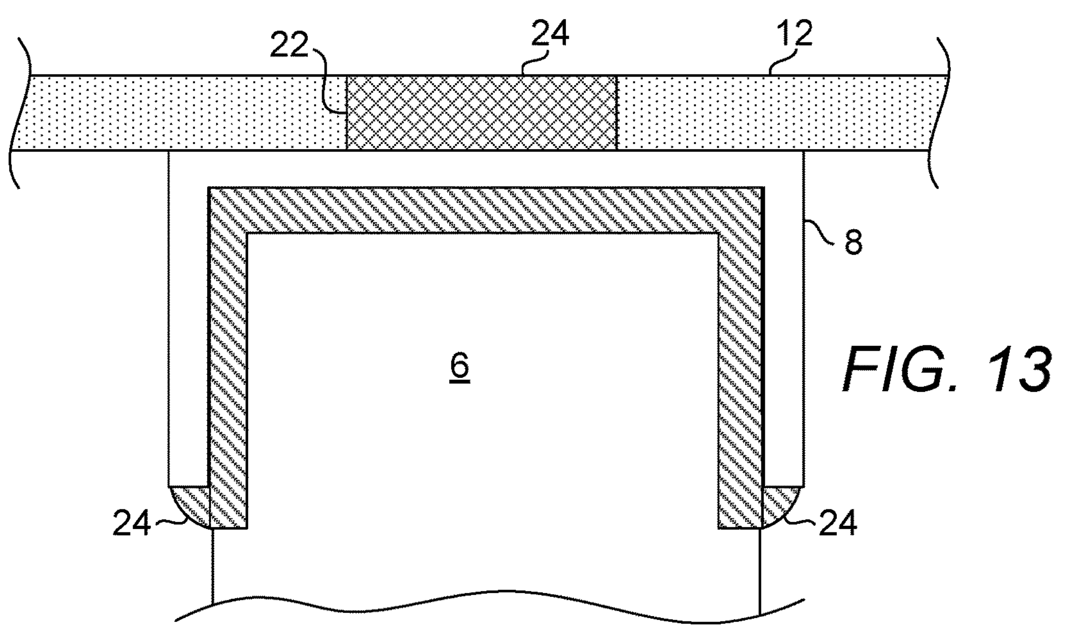
FIG. 13 is a partial close-up view of a portion of the holding tank labelled as B in FIG. 11.

FIG. 11 is a partially transparent rear view of a holding tank having a deck sheet that has been properly secured where the deck sheet has been secured to support pillars. FIG. 12 is a left side rear exploded perspective view of a holding tank with its deck sheet removed to show a manner in which the deck sheet is aligned with support assemblies disposed therewithin. If the deck sheet 12 is not fixedly secured to the support strip 8 and/or support pillar 6, a maximum droop of about 1 inch may result in a span 66, 78 of deck sheet 12 of mild steel of thickness of no greater than 1/4 inch after over 40,000 applications of vacuum of 10" of mercury. Stainless steel is often used in corrosive and/or moist environments. However, if stainless steel of similar thickness is used for the construction of the holding tank, cracking can occur more readily due not only to the repeated applications of partial vacuum but also to roading stresses, etc. Although aluminum may also be suitable, it can fatigue more readily than mild steel. As the holding tank 2 is required to be airtight, precautions must be taken during the construction of the holding tank 2 to ensure that the holding tank 2 can meet this requirement. For the construction of a large object such as the holding tank, it is often more efficient to assemble or build the object in a manner so that the resulting object is already disposed in an orientation suitable for final assembly onto a truckbed to avoid the need to flip or rotate a large weight before attaching the object to the truckbed. Therefore, the holding tank 2 is built from the ground up, e.g., a tank floor sheet 14 is laid before the walls 30 and reinforcing strips 10, etc., that are all disposed atop the tank floor sheet 14, are welded to the top surface of the tank floor sheet 14. However, if desired, the order in which the holding tank is built may be reversed if the eventual flip of the folding tank can be performed and tolerated. If the order is reversed, the sheet that is attached last to the support assemblies would be the tank floor sheet 14 and the portion of the support assemblies to be attached to would be the reinforcing strips 10. Once all of the support assemblies 4 and other essential components have been disposed within the space delineated by the tank floor sheet 14 and walls 30, the space is ready to be closed off with a deck sheet 12. A suitably-sized and shaped deck sheet 12 is eventually disposed atop the space and secured to the walls 30. The edges of the deck sheet 12 are welded to the top edges of the walls 30. However, if nothing else is done, the deck sheet 12 is simply supported on a plurality of support assemblies 4. Various fasteners, e.g., screws and tapped holes, may be used to secure the deck sheet 12 and support strips 8 together. However, if fasteners are used, each of these fasteners may fail due to corrosion, fatigue, etc., causing the holding tank to fail to be airtight and useful for its intended purposes. Applicant discovered that if the deck sheet 12 can be secured to the support assemblies 4 or another support structure of the holding tank from outside of the space defined by the tank floor sheet 14, peripheral walls 30 and the deck sheet 12 without using fasteners, a long-lasting, strong and relatively lightweight holding tank can result. Disclosed herein is a technique for securing the deck sheet 12 to the support assemblies 4. Each row of support assemblies includes a plurality of spaced-apart support pillars 6 that are each welded at one end to a support strip 8, e.g., one which comes in the form of a channel, and at the other end to a reinforcing strip 10. Shown herein are three rows of support assemblies 4 each aligned generally in parallel to a side wall 30. A plurality of spaced-apart holes 22 are disposed on the deck sheet 12 to coincide with each support strip or channel 8 when the deck sheet 12 is laid atop the support strip or channel 8. Upon laying the deck sheet 12 atop the support assemblies 4, the deck sheet 12 is ready to be secured to the support strips 8 given the access via holes 22 to support strips 8 from outside of the interior space of the holding tank. FIG. 13 is a partial close-up view of a portion of the holding tank labelled as B in FIG. 11. It shall be noted that the deck sheet 12 is secured to each support strip 8 by plug welding each hole 22 open root with weld 24 sealing off all of the holes 22 to form an impermeable deck sheet 12. At each hole 22, plug welding shall be performed starting from the center of the hole 22 and ending at the perimeter of the hole 22 in circular motion until the weld has filled the entire hole 22. Therefore, although the deck sheet 12 is disposed over the support strips 8, access to the support strip 8 is not lost, wherein this access allows the deck sheet 12 to be welded to the support strips 8, effectively reducing the deck sheet dimensions subjected to strain by securing the deck sheet 12 at shorter distances rather than the entire length of width of the holding tank. As the holding tank 2 is a low profile transportable holding tank, there is insufficient space within the interior space of the holding tank to accommodate a worker to weld from inside the interior space of the holding tank.

Figure 14:
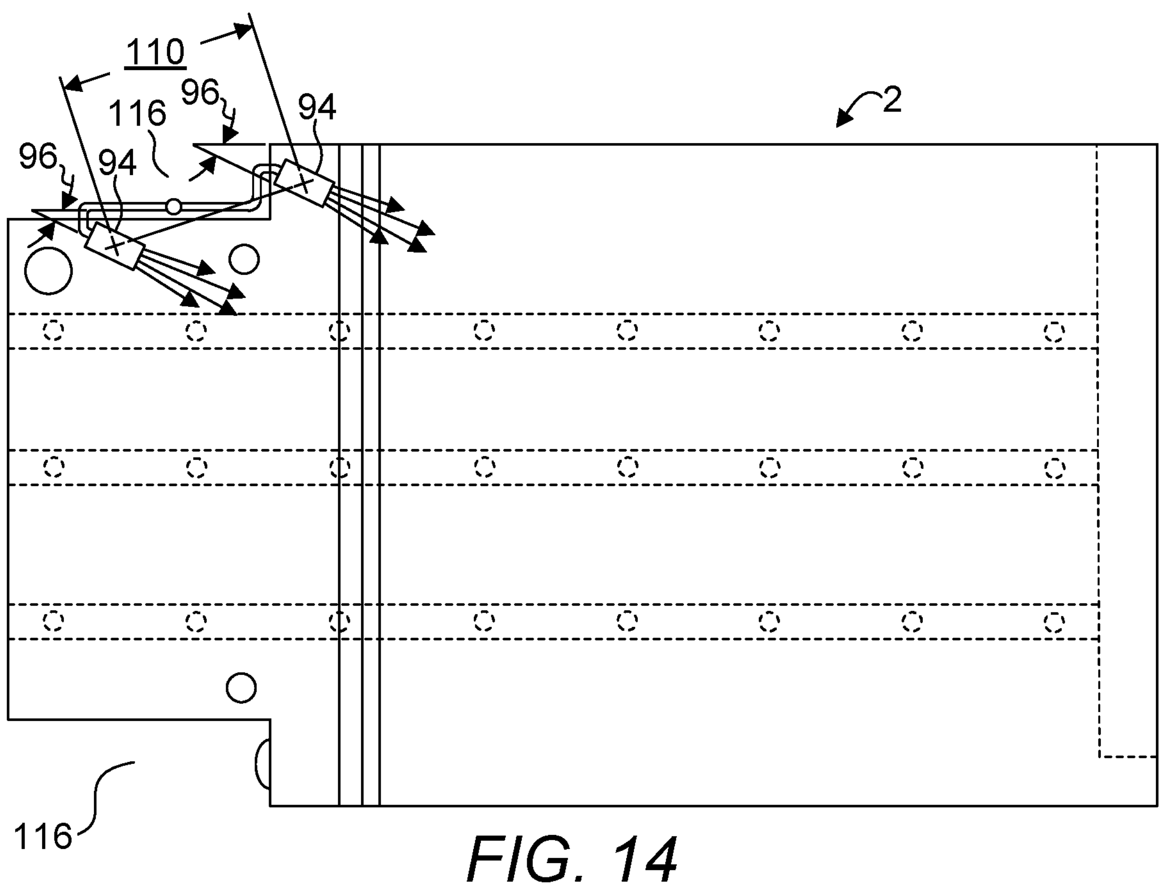
FIG. 14 is a partially transparent top view of a holding tank, depicting one embodiment of a self-cleaned low profile holding tank.
Figure 15:
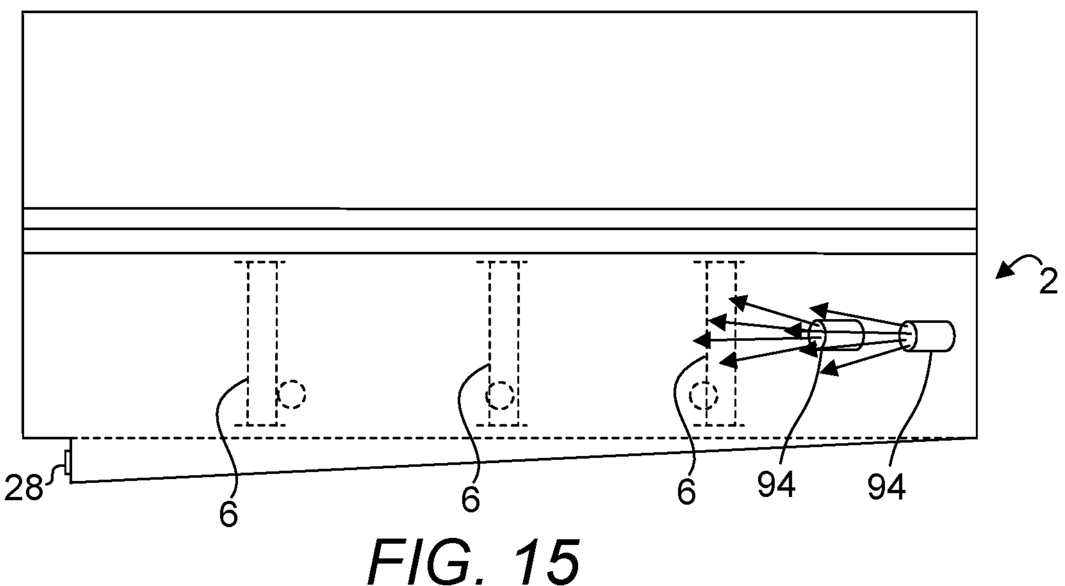
FIG. 15 is a partially transparent rear view of a holding tank depicting one embodiment of a self-cleaned low profile holding tank.

As a low profile holding tank is inaccessible to cleaning personnel, cleaning is typically carried out by first filling the low profile holding tank with water or a mixture of water, detergent or a mixture of water, detergent and disinfectant before the low profile holding tank is moved back and forth, e.g., by moving the truck upon which the low profile holding tank is disposed back and forth to create movements of water or mixture in the form of splashes/sloshes to aid in dislodging wastes adhered to surfaces, e.g., the peripheral walls, ceiling (bottom surface of deck sheet), floor (top surface of tank floor sheet). Regular cleaning of a holding tank ensures that corrosive agents that may be present in the holding tank can be removed to cease their continued attack of the on interior surfaces of the holding tank if vulnerable spots have formed on the interior surfaces. While the conventional technique may be effective to a limited degree in the cleaning of the interior surfaces of the holding tank, the cleaning process involves the use of the vehicle upon which the holding tank is disposed, increasing the wear-and-tear to the vehicle with frequent start and stop movements of the vehicle while carrying a large load of the holding tank, the effectiveness of the cleaning process is intimately related to the skills of the operator of the cleaning process and can be inconsistent. Applicant discovered that by suitably placing the two nozzles 94 in the interior space of a low profile holding tank, the holding tank can be properly cleaned. FIG. 14 is a partially transparent top view of a holding tank, depicting one embodiment of a self-cleaned low profile holding tank 2. FIG. 15 is a partially transparent rear view of a holding tank, depicting one embodiment of a self-cleaned low profile holding tank 2.

The depth 20 of the holding tank 2 is usually 1 ft. Some holding tanks may be as long as 20 ft and have a 1 ft or an 8-inch depth. Given the above measurements of the holding tank 2, various values of the aspect ratio can be calculated. For example, with the 10 ft long holding tank 2 one may divide the depth (1 ft) into the width at the indents (6 ft), into the more general width of 8 ft, into a width of 8.5 ft or into the length of 20 ft. The holding tank 2 therefore has aspect ratios of 6, 8, 8.5 and 20. Even the least of these values represents a significant departure from the "ideal" aspect ratio of 1. A holding tank 2 that is 20 ft long and 8 inches deep has aspect ratios as high as 30. A holding tank 2 of high aspect ratio presents a challenge to be cleaned because of its lack of accessibility due to the holding tank's depth that is much less than its length or width. Further, the size of the interior space that is rather large also presents a challenge to the reach and the number of cleaning nozzles that are required. Compared to a low profile holding tank where baffles are used to provide and enhance structural integrity to the holding tank, the present support assemblies 4 include pillars instead of baffles. The use of pillars minimizes the obstructions the support assemblies 4 present to sprays of water, mixture or steam from one corner to another diagonally opposed corner of the holding tank. Disclosed herein is a low profile holding tank having an aspect ratio of at least 6 and configured for holding a volume of waste of no less than about 100 gallons, the low profile holding tank including a generally rectangular interior space and only two nozzles. The holding tank has two sides, two front corners each corresponding to one of the two sides and two rear corners, each corresponding to one of the two sides. A discharge port is disposed on one of the rear corners of a first of the two sides and the front corners are disposed at an elevation higher than the rear corners. Each nozzle is configured for receiving a fluid supply of about 3 GPM at about 4000 psi and each nozzle is disposed within the space and fixedly attached within the space. The two nozzles are mounted on one of the front corners of a second of the two sides disposed opposite that of the first of the two sides. In one embodiment, each nozzle 94 is mounted with its heading 96 disposed at an angle of from about 20 to about 40 degrees with respect to the closest side wall 30 at which the nozzles 94 are disposed. An activation of the fluid supply system causes the interior space to be cleaned from the corner to which the only two nozzles are mounted to the corner at which the discharge port is disposed. In one embodiment, the two nozzles are spread apart from about 12 to about 18 inches. In one embodiment, the low profile holding tank is a low profile transportable holding tank.

Figures 16, 17:
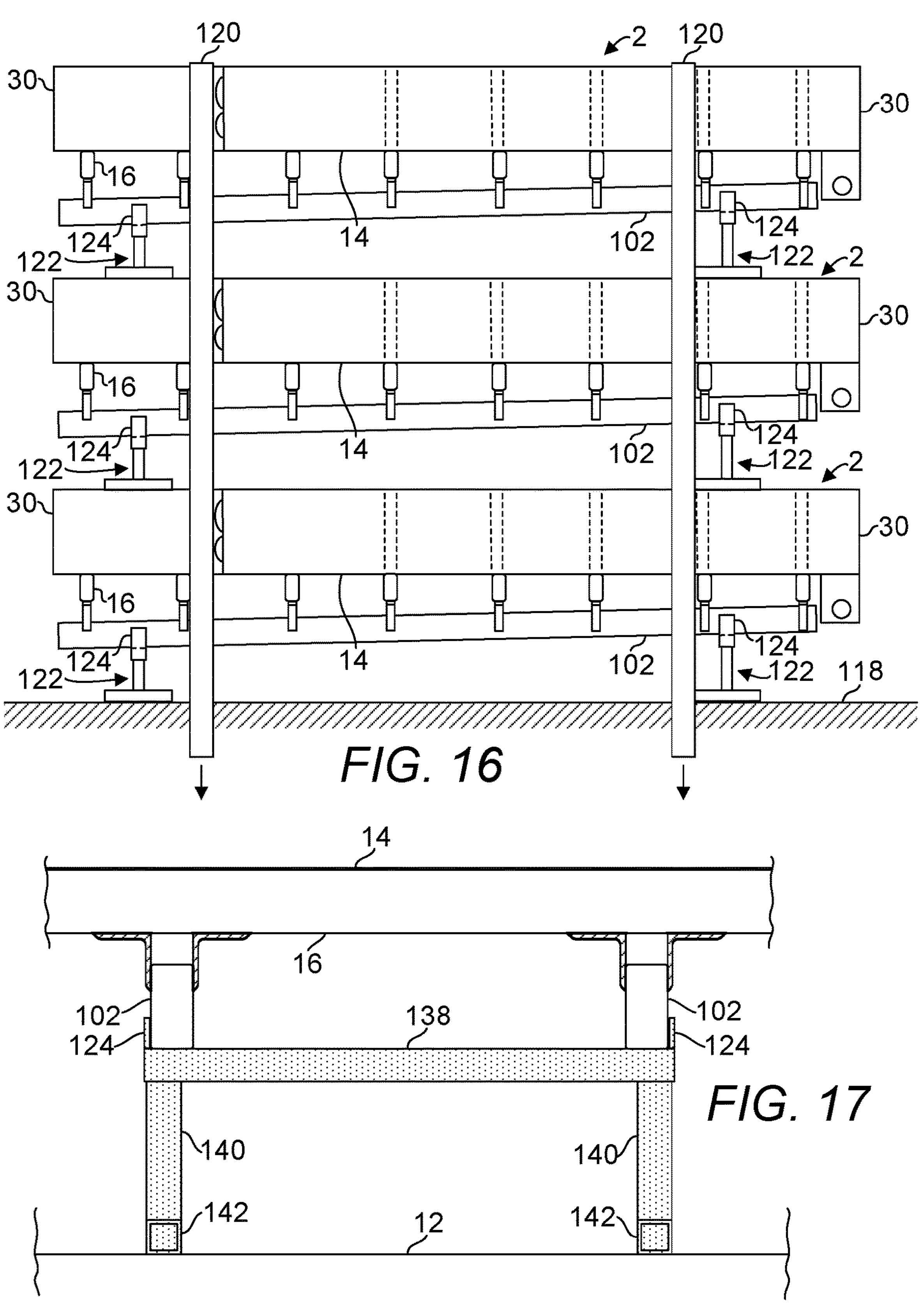
FIG. 16 is a side partial view of three holding tanks stacked and secured for transportation.
FIG. 17 is a front partial view of two holding tanks stacked for transportation.

FIG. 16 is a side partial view of three holding tanks 2 stacked and secured for transportation. FIG. 17 is a front partial view of two holding tanks stacked for transportation. During the construction or assembly of a holding tank, the finished or unfinished holding tank may need to be transported from one location to another. For instance, a holding tank built at a first location may be transported on a trailer deck 118 to be fitted on a truckbed at a second location as it would not be economically feasible to transport the truckbed (along with a truck) to be fitted with a holding tank. Applicant discovered a solution which allows holding tanks to be transported securely and economically from one location to another. Provided herein is a pair of support members 122 separating holding tanks 2 stacked upon one another. The height of each support member is preferably configured in a way to allow the holding tanks 2 to be stacked in a manner such that the deck 12 of each holding tank 2 is disposed parallel to the direction of travel of a vehicle transporting the holding tanks 2 in order to reduce wind resistance and tie-down requirements to secure the holding tanks in place for transportation. Each support member 122 includes essentially a pair of spread-apart support legs 140 held together by a cross bar 138 with all these parts disposed in a first plane. A stabilizer bar 142 is disposed at the bottom of each support leg 140 in a second plane that is disposed at a right angle to the first plane. As the second plane is disposed in a manner parallel to the direction of travel of a vehicle transporting the holding tanks 2, this increases the grip the support members provide to the two stacked holding tanks 2. Each support leg 140 is configured to extend upwardly on each outside wall of the support legs 140 into a tab 124 which limits lateral movements the supported holding tank 2 relative to the holding tank 2 underneath it. The stacked holding tanks 2 may be secured to a trailer deck 118 by using a plurality of straps 120.

Figure 18:
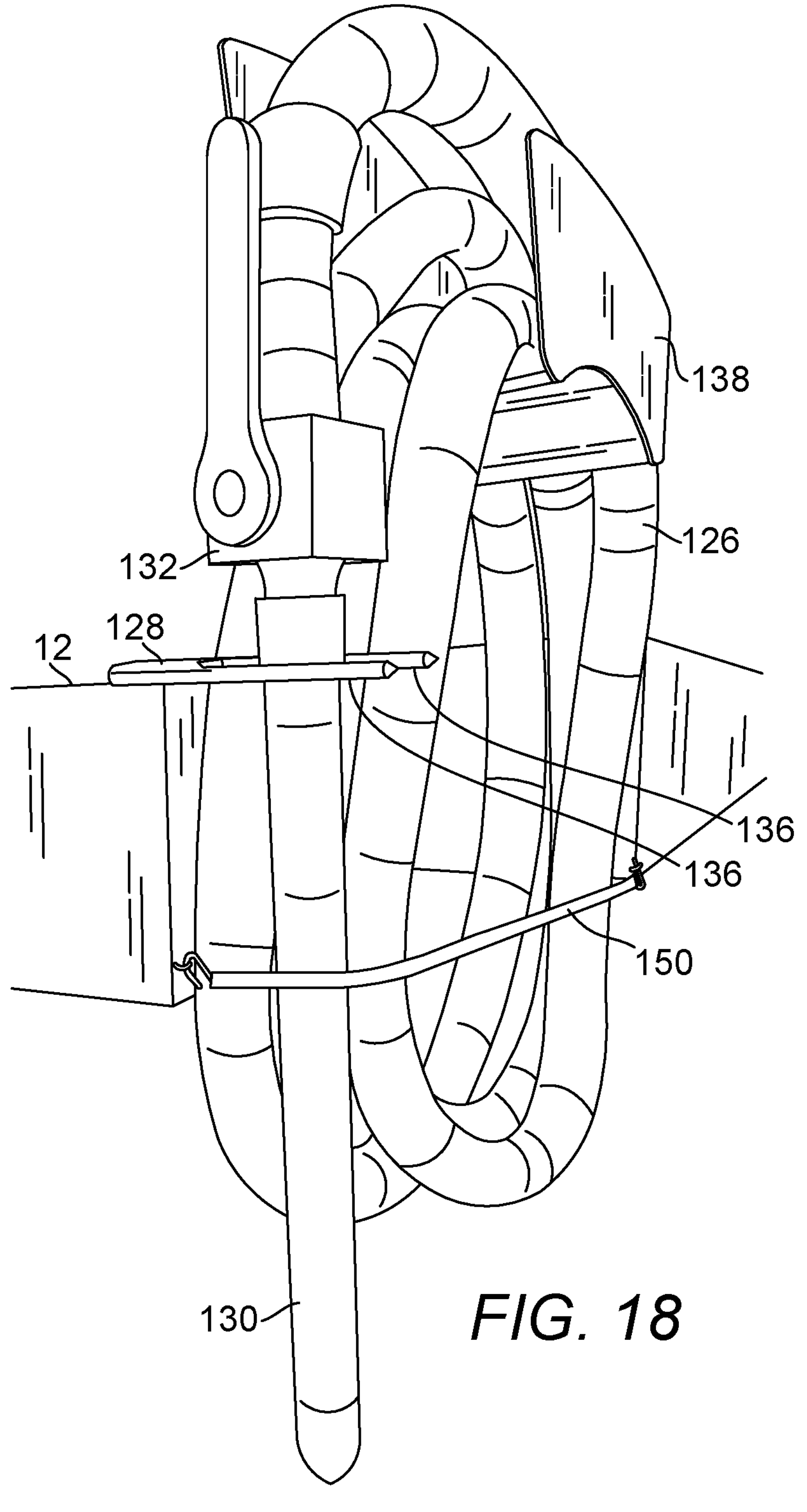
FIG. 18 is a diagram depicting a mechanism for enabling convenient stowage of a suction hose of a transportable sewage system.

FIG. 18 is a diagram depicting a mechanism for enabling convenient stowage of a suction hose 126 of a transportable sewage system. A suction system is critical for a sewage system to transfer sewage from a site to a transportable sewage system. The ease with which a suction hose can be deployed, cleaned and stowed away is critical in a sewage-gathering operation of the transportable sewage system. A suction hose provided with a transportable sewage system has a typical length of about 20-50 ft and has the free end equipped with a suction tip 130. At such length, the suction hose can be used to reach a septic tank disposed at a great distance. With the great length, gathering of the suction hose can pose a challenge. The tip 130 is essentially a rigid tube tapered to a reduced size at its free end and a valve 132 disposed at the base of the tip 130. Applicant discovered that a hose holder 134 around which the hose 126 can be coiled can facilitate the stowage of the hose 126 by allowing the hose 126 to be coiled and stowed neatly on the hose holder 134. A pair of hooks 128 with prongs 136 spread apart a distance appropriate to allow the tip 130 to be slid between the hooks 128, is provided. When the suction hose 126 is again needed, the tip 130 can again be slid out and released. Further, with the tip 130 pointing downwardly in the stowed position of the suction hose, any substantial moisture remaining in the hose upon getting cleaned can be drained, resulting in a clean hose. Upon stowing a hose 126, the hose along with its tip can be further secured using a strap 150, detachable at least at one point by means of a clasp.

Figure 19:
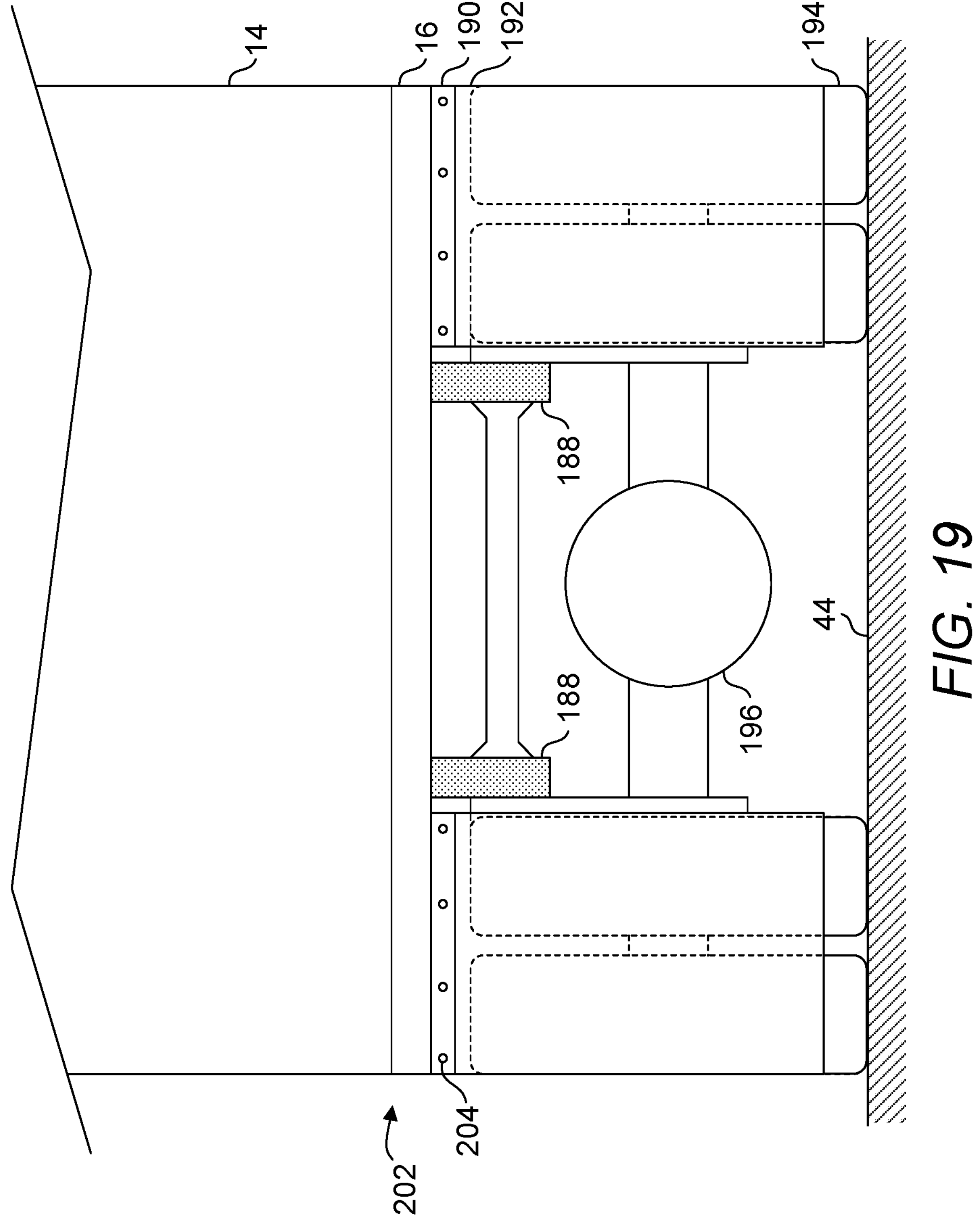
FIG. 19 is a rear view of a truck depicting a manner in which a piece of equipment is mounted to the truck near a rear end of the truck.

Most trucks are constructed with ladder-type frames with frame or side rails and crossmembers. In use, the side rails are subjected to various types of loads, e.g., vertical, torsional and side loads. In conventional settings, side rails are used to support vertical and side loads, e.g., engine, transmission, bodies, storage boxes or systems, tool boxes, battery boxes, fuel tanks, suspensions, cargo and work equipment, e.g., lift gates and lift buckets, etc. Crossmembers are useful for providing torsional rigidity and supporting components, e.g., engine, transmission and radiator, etc. In the trucking industry, general purpose trucks or vehicles having side rails sufficiently strong and rigid to anticipate the eventual use of the trucks in various industries which require side rails to function without fail, are provided by truck manufacturers. Although crossmembers are provided to prevent the side rails from twisting with side loads, e.g., due to a fuel tank, battery box and tool box, these loads are unnecessarily placed on the side rails without a means for allowing these equipment to be changed out with ease. Typically, the brackets useful for supporting equipment on a side rail are secured by means of fasteners, e.g., nuts and bolts or welding and any support structures for supporting the equipment, e.g., storage or tool boxes are required to be custom made and modifications may be needed on a side rail to support the equipment. Either means requires the side rails to be modified which can potentially weaken the side rail. For instance, a hole drilled in a side rail can weaken the side rail by breaking a protective seal, provided, e.g., by protective paint or powder coating of a barrier, causing the side rail to rust. Further, if a hole is incorrectly located on the side rail, the hole can significantly affect the integrity of the side rail. A side rail section supported at each end, e.g., by axles and springs and loaded in the middle is disposed in compression at the top of the side rail and in tension at the bottom of the side rail. A neutral axis void of stress exists in the side rail. Holes or welding disposed outside of this neutral axis can significantly affect the side rail strength. Holes and welding near flanges of a side rail can cause frame failure. This problem is made more acute with side loads due to the weight of tool boxes and fuel tanks, etc., secured to these holes or welded to the side rail. If a modification is made after a truck has been put in service, protective coatings may not be applied to the frame to protect it from the elements, increasing the likelihood that the modified portions of the side rail and the fasteners used therein may not be protected from rust. For a truck having a body mounted atop its side rails, it is possible for a piece of equipment, e.g., mud flap 192, to be mounted on the body instead of the side rails 188. FIG. 19 is a rear view of a truck depicting a manner in which a piece of equipment, e.g., a mud flap 192, is mounted to the truck near a rear end of the truck. When a mud flap 192 is mounted to a body, a support bracket 190 welded to the body is often used to hold the mud flap 192 at its top edge using fasteners 204 in a fixed location relative to the wheels it is coupled with. The lack of a mechanism that allows the mud flap 192 to be mounted at any desired location restricts the type of mud flaps that can be used with a truck as various mud flap manufacturers can have different means for securing a mud flap 192, reduces the ease to replace a mud flap 192 as a support bracket 190 may need to be cut out with a torch if it is required to be replaced and limits the choice of location for mounting a mud flap.

Figure 20:
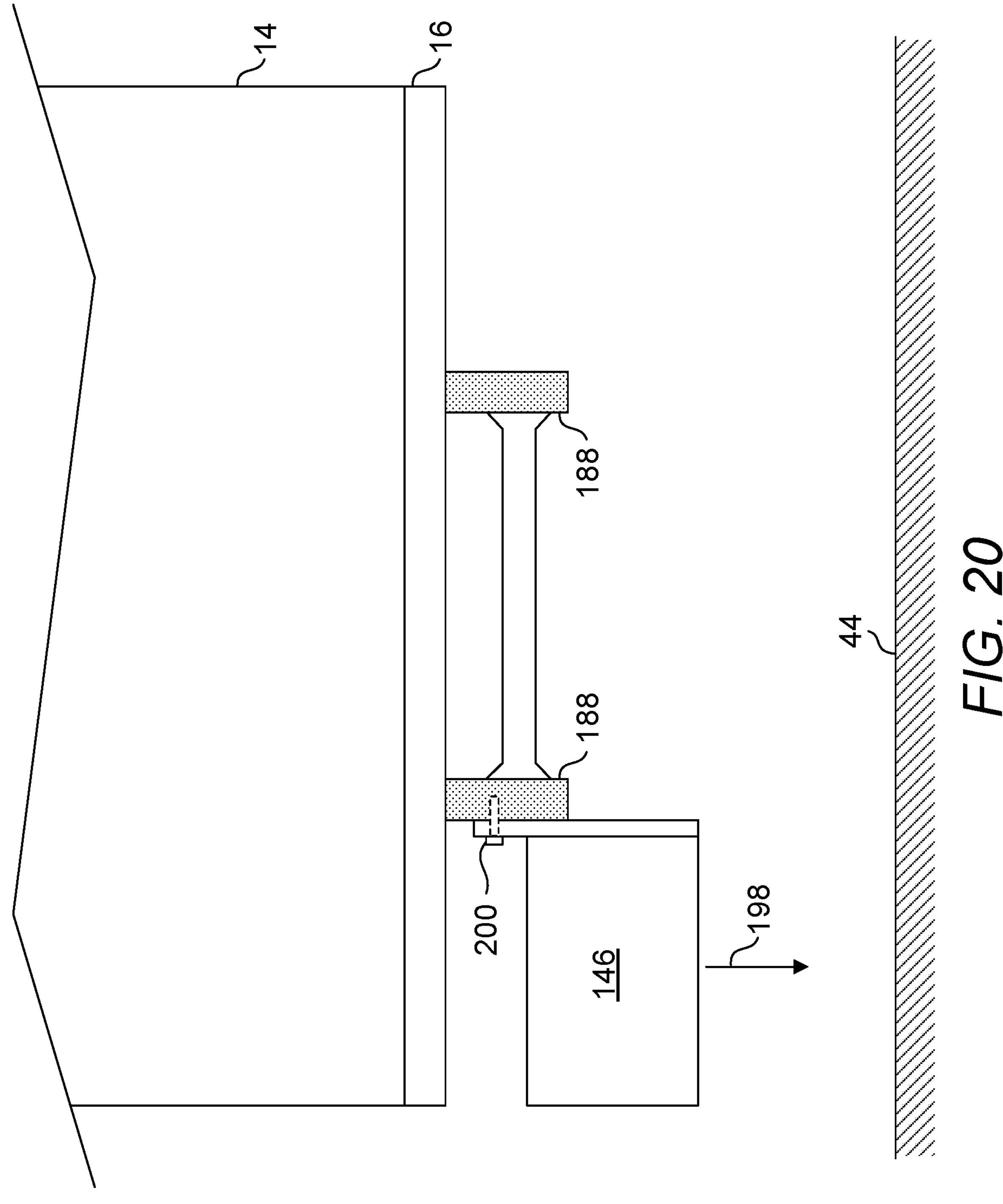
FIG. 20 is a rear view of the truck of FIG. 19 with a drive train of the truck removed to reveal a manner in which a piece of equipment is mounted to a side rail of the truck.

FIG. 20 is a rear view of the truck of FIG. 19 with a drive train including wheels 194 and the rear axle 196 of the truck 202 removed to reveal a manner in which a piece of equipment, e.g., a tool box 146, is mounted to a side rail 188 of the truck 202. It shall be noted that the attachment which includes the tool box 146 and any attachment mechanisms 200, e.g., brackets, fasteners, together exert a torque due to gravity on the side rail 188 upon which the tool box 146 is mounted. When the dynamic effects of a roading or off-roading truck are considered, the resulting torque can significantly impact the side rail 188 upon which the tool box 146 is mounted, causing damages, due to, e.g., bending, to the side rail 188.

Figure 21:
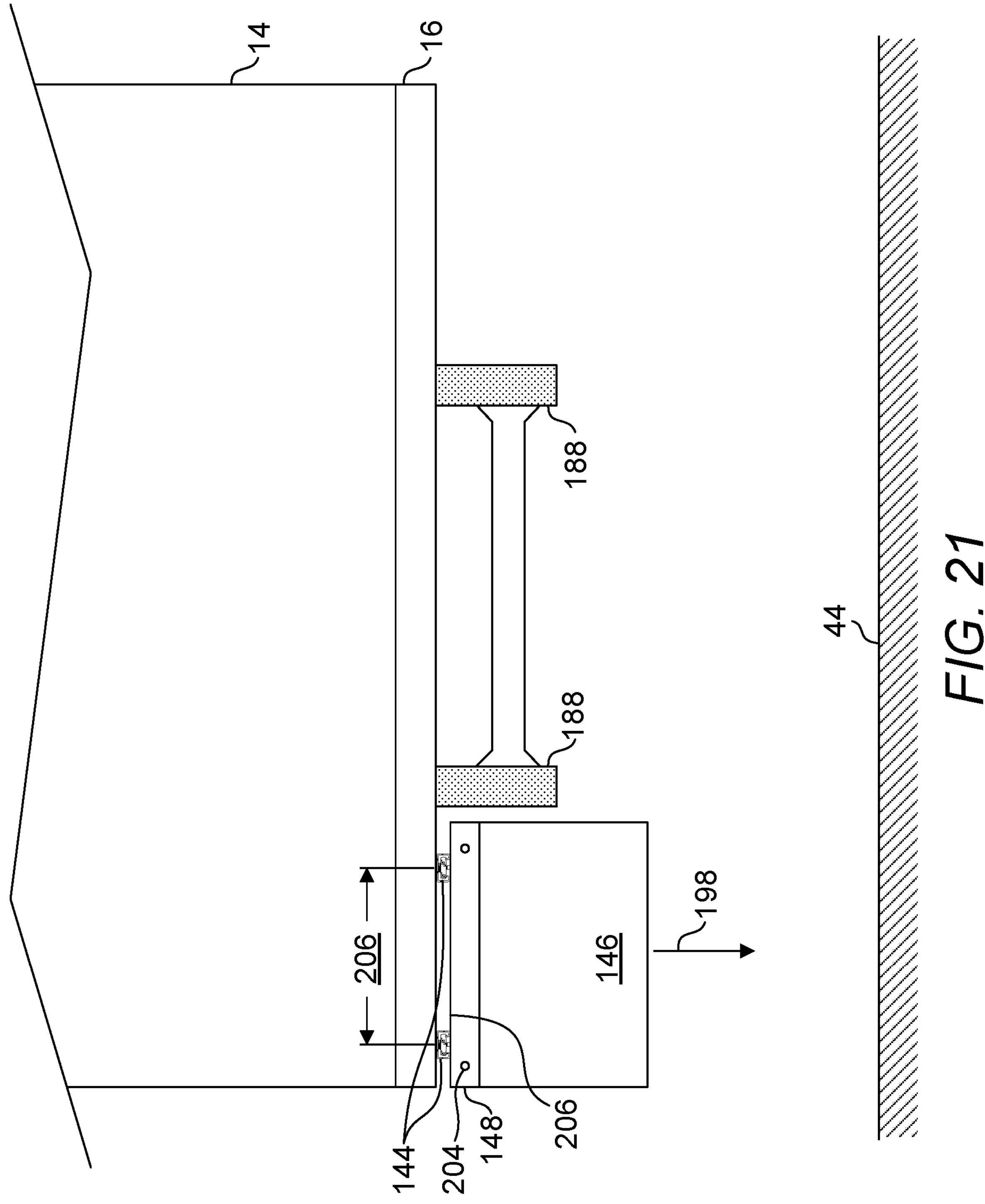
FIG. 21 is a rear view of the truck of FIG. 19 with a drive train of the truck removed to reveal a manner in which a piece of equipment is mounted to the body of the truck by means of a rail-based mechanism.

FIG. 21 is a rear view of the truck of FIG. 19 with a drive train including wheels 194 and the rear axle 196 of the truck 202 of the truck removed to reveal a manner in which a piece of equipment is mounted to the body, e.g., a low profile transportable holding tank, of the truck by means of a rail-based mechanism or apparatus. In the embodiment shown, the rail-based mechanism includes two rails 144 although additional rails may be used. A minimum of two rails is required to provide attachment locations that are disposed in a plane that encompasses the two rails. Here, the weight of the attachment which again includes the tool box 146 and any attachment mechanisms 200, e.g., brackets, fasteners and rails, do not exert a torque on any side rails 188, therefore not imparting any damaging torques directly on the side rails. The weight of the attachment is simply borne by the body 14 via one or more transverse support bars 16 that supports the body 14 and span side-to-side across a bottom surface of the body 14.

Figure 22:
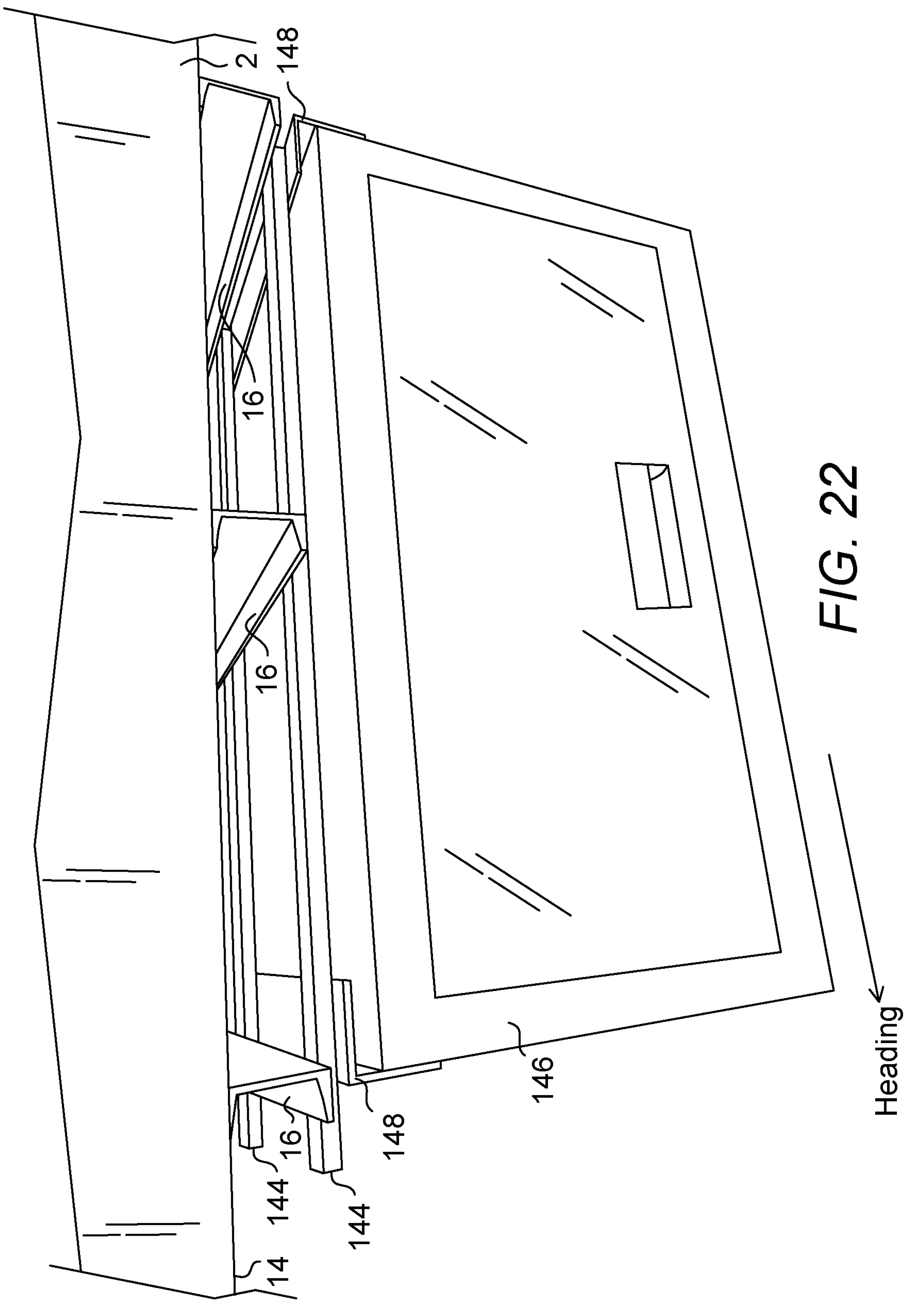
FIG. 22 is a diagram depicting a rail-based mechanism for allowing installation of various equipment or containers under a holding tank for securing and transporting various tools.

The strategy useful for supporting a piece of equipment under the body 14 of a truck as disclosed in FIG. 21 can be applied to a truck equipped with a holding tank 2 as shown throughout herein. FIG. 22 is a diagram depicting a rail-based mechanism for allowing installation of various equipment or containers under a holding tank 2 for securing and transporting various tools. The rail-based mechanism preferably includes more than one rail 144, e.g., two rails, secured to at least two transverse support bars 16. Each rail 144 is essentially a channel having a path configured for receiving fasteners that are secured to mounting points of a piece of equipment mounted to the rails 144. For instance, as shown herein, a tool box 146 is mounted at four points, each point being located substantially at one end of a mounting plate 148 of the toolbox. As each fastener is slidable along a path of a rail, the position of the toolbox in a lengthwise direction of the rail is adjustable before the fasteners are tightened against their respective nuts or other securing features to lock the tool box 146 in its preferred position. Although only a tool box 146 is shown, similar strategies can be applied to other equipment to secure them in place underneath the holding tank 2. In general, a vehicle, e.g., truck, body may or may not be supported by a plurality of cross bars, e.g., cross bars 138. In cases where there are no readily available cross bars, new cross bars or other support structures may be erected to serve as bases for securing a pair of rails configured for supporting equipment mounted thereon.

Figure 23:
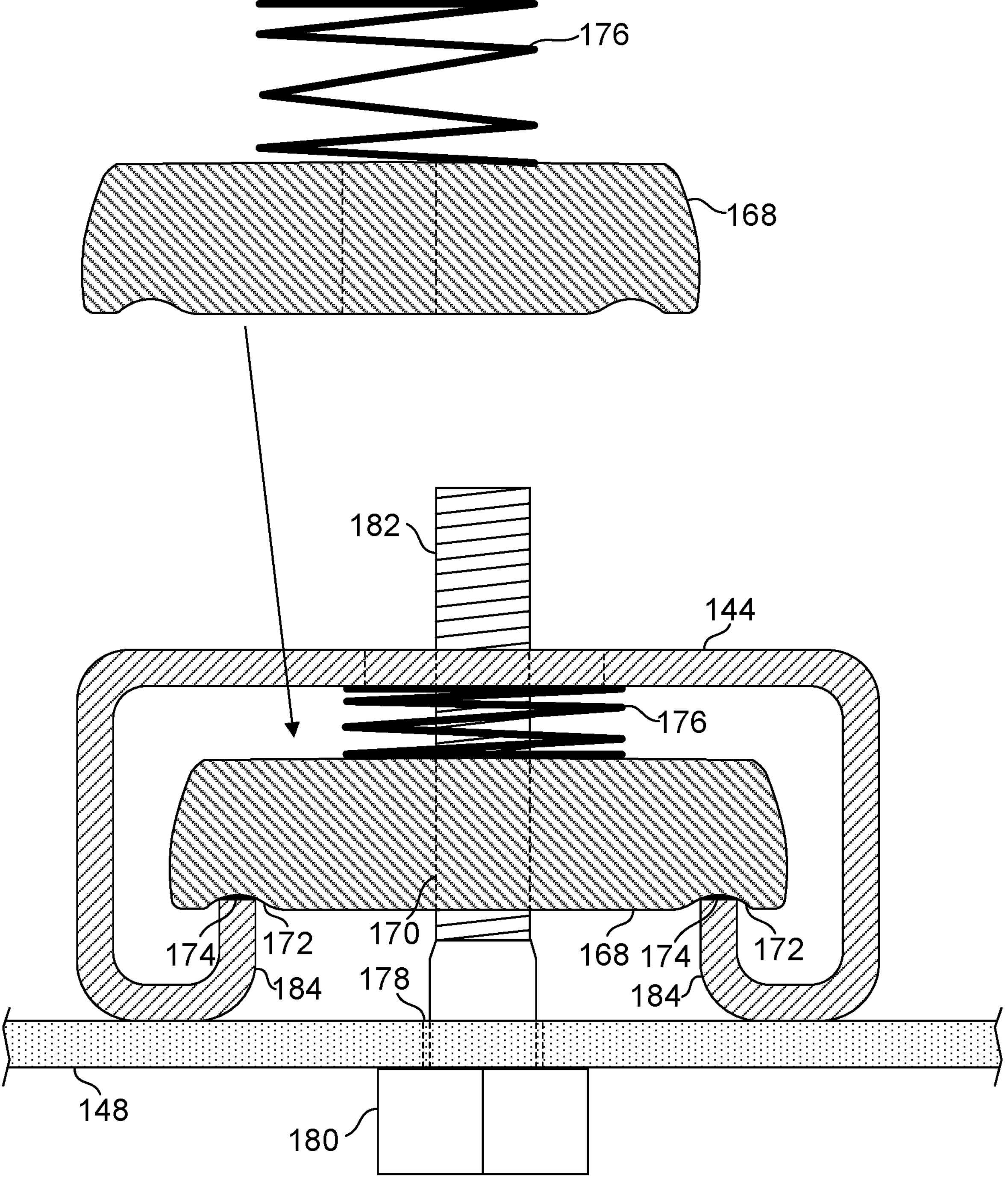
FIG. 23 is a partial cross-sectional view of a rail with a captive nut shown with a spring attached thereto that is disposed in its uncompressed state and a second captive nut shown disposed in the rail.
Figure 24:
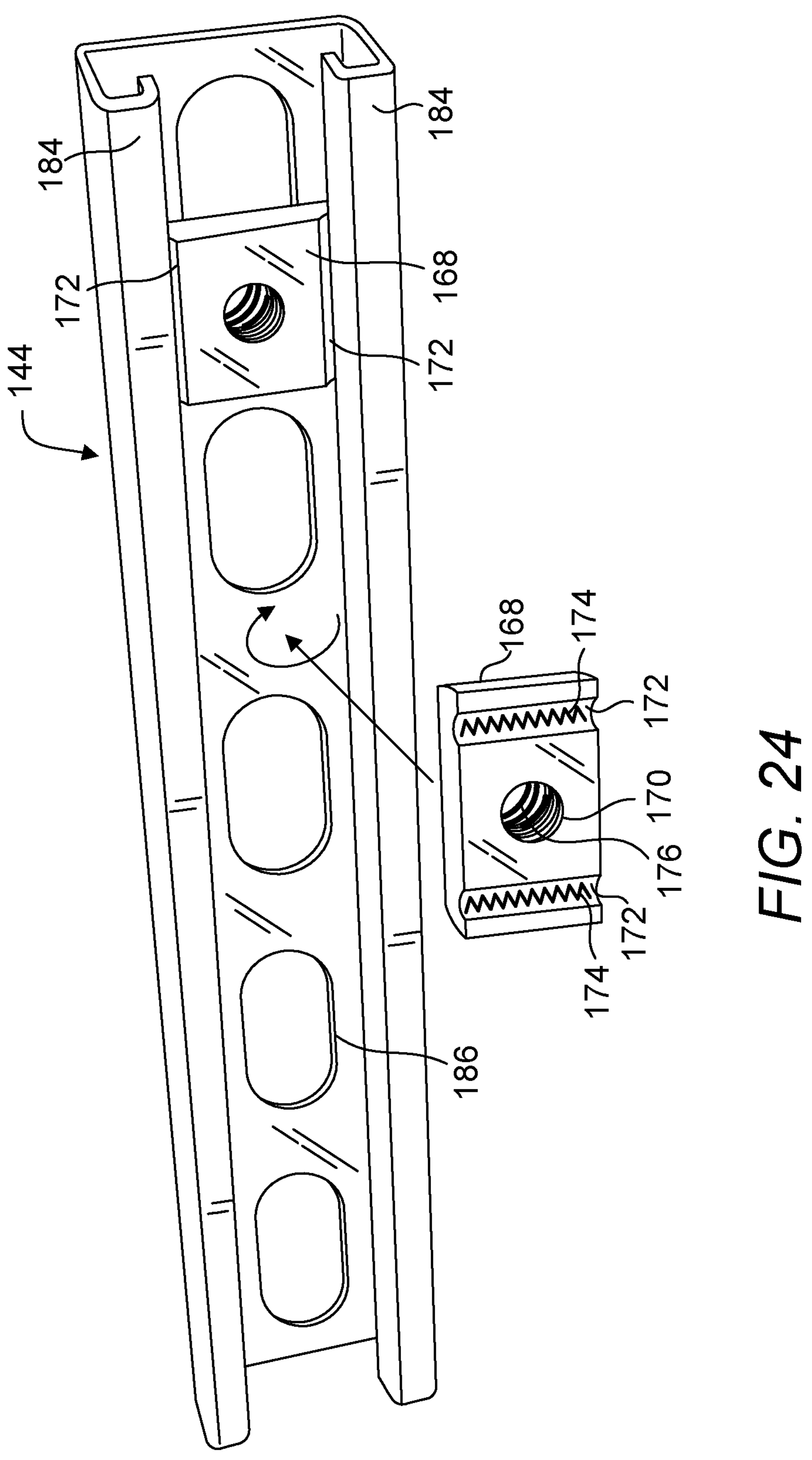
FIG. 24 is a bottom perspective view of a short rail section with a captive nut shown aligned with an opening of a rail in anticipation to be seated within the channel and a second captive nut shown seated in the short rail section.

In one example, the rails and their respective fasteners useful to be secured to the rails are shown in FIG. 23. FIG. 23 is a partial cross-sectional view of a rail 144 with a captive nut 168 shown with a spring 176 attached thereto that is disposed in its uncompressed state and a second captive nut 168 shown disposed in the rail 144. FIG. 24 is a bottom perspective view of a short rail section with a captive nut 168 shown aligned with an opening of a rail in anticipation to be seated within the channel and a second captive nut 168 shown seated in the short rail section. Each rail 144 can be made as elongated as it is necessary. The rail 144 is essentially a channel with two walls each wall having an edge that is curled back to form a retaining element 184 for the captive nut 168 to be secured. Each captive nut 168 includes a threaded hole 170 configured for receiving the threaded portion 182 of a bolt 180. Slots 186 are available on a surface of a rail 144 to allow longer bolts coupled with captive nuts 168 to be accommodated and protrude beyond the surface, an example of which is shown in FIG. 23. In one example, the rails are mounted apart at a spread 206 of about 6 to 24 inches, in parallel to form a plane 208 on which a piece of equipment can be mounted. This plane need not be substantially parallel with a road surface although in many occasions, the ability to dispose this plane parallel with the road surface facilitates mounting of the equipment as this plane can be used as a datum from which a piece of equipment can be mounted. In one example, the rails 144 can be welded or otherwise secured to one or more transverse support bars 16. If the rails 144 are welded to the transverse support bars 16, at least the weld joints are preferably corrosion protected, e.g., by powder coating. In securing a piece of equipment to the rails 144, the location at which the equipment is located, is first determined. Care must be taken to ensure that any necessary support points of the equipment must coincide with the channels of the rails 144 such that fasteners can be applied to the rails 144 to support the equipment. The equipment may be connected directly via fasteners to the rails if suitable support points of the equipment are available. However, in most cases, mounting plates 148, e.g., those shown in FIGS. 21 and 22, may be used to relieve the requirement for the equipment to provide precisely located support points of the equipment with respect to the rails 144. Appropriate apertures 178 can simply be provided on the mounting plate/s 148 to allow a bolt 180 to be threaded through the aperture 178 to secure the mounting plate/s 148 to the captive nut 168 at a rail 144. The equipment can then be secured to the mounting plate/s 148 with fasteners, e.g., screws and nuts.

Referring to FIG. 24, in securing a captive nut 168, the captive nut 168 may be orientated with its lateral ends aligned with the channel opening of a rail 144 and with its spring 176 facing the channel opening before the captive nut 168 is fully disposed in the channel with the spring 176 compressed against the rail 144. With the spring sufficiently compressed against the rail 144, the captive nut 168 is then rotated about 90 degrees until the edges of the rail 144 are seated in the channels 172 of the captive nut 168. The friction elements 174, e.g., stamped patterns, disposed in the captive nut 168 channels 172 aid in preventing inadvertent slides of the captive nut 168 along the rail 144 upon its installation. Although only one type of fasteners has been demonstrated as being suitable to be coupled to the rails, the present concept of using rails to support loads due to equipment on a mobile system, e.g., a road or off-road vehicle, is not limited to the use of such fasteners. Other types of fasteners may be used as long as each rail is capable in receiving fasteners substantially at any location along the length of the rail. It shall be noted that, with the system shown in FIGS. 21-22, a change out or removal of an installed equipment requires only the removal and installation of fasteners, a process unlike one required for welded parts. It shall further be noted that, without securing equipment to side rails, the side rails are free from concentrated loads exerted on the side rails due to attached equipment as in the case of conventional practices shown in FIG. 20. It shall further be noted that, in one preferred embodiment, the pair of rails 144 shown in FIGS. 21-22, are disposed in a manner parallel to the heading of the vehicle upon which the rails 144 are disposed as the forces exerted on the rails 144 are frequently exerted while the vehicle slows or accelerates and aligning the rails 144 in this manner prevents lateral forces (which tends to buckle the rails 144) from being exerted on the rails 144 while allowing mainly axial forces to be experienced in the rails 144. In one embodiment, the rails 144, captive nuts 168 and other related fasteners are constructed from galvanized steel for their resistance to rust even when directly exposed to atmosphere. In one embodiment, these parts are powder coated for rust resistance. Although a truck is shown to illustrate the use of rails to mount a piece of equipment on the truck, this strategy can be applied to any mobile systems including a side rail and a body disposed over the side rail.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A method for securing a piece of equipment selected from the group of a toolbox, a mud flap, or a fuel tank, to a mobile, wherein the vehicle includes a side rail and a body supported on the side rail, method comprising the steps of:

(a) disposing a pair of rails underneath and supported by the body; and (b) removably securing the equipment to the pair of rails with a securing mechanism comprising a captive nut.

2. The method of claim 1, further comprising disposing the pair of rails parallel to a heading of the vehicle.

3. The method of claim 1, further comprising disposing the pair of rails in parallel and spaced apart about 6 to 24 inches.

4. The method of claim 1, further comprising powder coating the pair of rails.

5. The method of claim 1, wherein at least one of the pair of rails comprises a slot for accommodating the securing mechanism.

6. The method of claim 1, wherein the vehicle is a truck.

7. The method of claim 1, further comprising disposing a transverse support bar between the pair of rails and the piece of equipment to facilitate the securing step.

8. An apparatus for securing a piece of equipment selected from the group of a toolbox, a mud flap, or a fuel tank, to a mobile, wherein the vehicle including a side rail and a body disposed over the side rail, the apparatus comprising: (a) a pair of rails disposed underneath and supported by the body, wherein the pair of rails are disposed in parallel, and (b) a securing mechanism configured to removably secure the piece of equipment to the pair of rails, wherein the securing mechanism comprises a captive nut.

9. The apparatus of claim 8, wherein the pair of rails are configured to be disposed parallel to a heading of the vehicle.

10. The apparatus of claim 8, wherein the pair of rails are spaced apart about 6 to 24 inches.

11. The apparatus of claim 8, wherein the pair of rails are powder coated.

12. The apparatus of claim 8, wherein at least one of the pair of rails comprises a slot.

13. The apparatus of claim 8, wherein the vehicle is a truck.

14. The apparatus of claim 8, further comprising a transverse support bar disposed between the pair of rails and the equipment in order for the bar to facilitate securement of the piece of equipment to the mobile system.

* * * * *